United States Patent
Weinzaepfel et al.

(10) Patent No.: US 11,003,956 B2
(45) Date of Patent: May 11, 2021

(54) SYSTEM AND METHOD FOR TRAINING A NEURAL NETWORK FOR VISUAL LOCALIZATION BASED UPON LEARNING OBJECTS-OF-INTEREST DENSE MATCH REGRESSION

(71) Applicant: Naver Corporation, Seongnam-si (KR)

(72) Inventors: Philippe Weinzaepfel, Montbonnot-Saint-Martin (FR); Gabriela Csurka, Crolles (FR); Yohann Cabon, Montbonnot-Saint-Martin (FR); Martin Humenberger, Gières (FR)

(73) Assignee: Naver Corporation

( * ) Notice: Subject to any disclaimer, the term of this patent is extended or adjusted under 35 U.S.C. 154(b) by 111 days.

(21) Appl. No.: 16/414,125

(22) Filed: May 16, 2019

(65) Prior Publication Data
US 2020/0364509 A1 Nov. 19, 2020

Related U.S. Application Data

(60) Provisional application No. 62/848,757, filed on May 16, 2019, provisional application No. 62/848,771, (Continued)

(51) Int. Cl.
*G06K 9/62* (2006.01)
*G06T 7/70* (2017.01)
*G06T 7/10* (2017.01)

(52) U.S. Cl.
CPC ......... *G06K 9/6262* (2013.01); *G06K 9/6256* (2013.01); *G06T 7/10* (2017.01);
(Continued)

(58) Field of Classification Search
CPC .. G06K 9/6262; G06K 9/6256; G06K 9/6271; G06T 7/70; G06T 7/10;
(Continued)

(56) References Cited

U.S. PATENT DOCUMENTS 10,083,523 B2 * 9/2018 Versace ..................... G01S 7/41
2006/0012493 A1 1/2006 Karlsson et al.
(Continued)

OTHER PUBLICATIONS

Bloesch, Michael, Michael Burri, Sammy Omani, Marco Hutter, and Roland Siegwart. 'Iterated Extended Kalman Filter Based Visual-Inertial Odometry Using Direct Photometric Feedback'. The International Journal of Robotics Research 36, No. 10 (Sep. 2017): 1053-72. https://doi.org/10.1177/0278364917728574. 2017.
(Continued)

*Primary Examiner* — Aaron W Carter
(74) *Attorney, Agent, or Firm* — Michael J. Nickerson; Basch & Nickerson LLP

(57) ABSTRACT

A method for training, using a plurality of training images with corresponding six degrees of freedom camera pose for a given environment and a plurality of reference images, each reference image depicting an object-of-interest in the given environment and having a corresponding two-dimensional to three-dimensional correspondence for the given environment, a neural network to provide visual localization by: for each training image, detecting and segmenting object-of-interest in the training image; generating a set of two-dimensional to two-dimensional matches between the detected and segmented objects-of-interest and corresponding reference images; generating a set of two-dimensional to three-dimensional matches from the generated set of two-dimensional to two-dimensional matches and the two-dimensional to three-dimensional correspondences corresponding to the reference images; and determining localization, for each training image, by solving a perspec-
(Continued)

tive-n-point problem using the generated set of two-dimensional to three-dimensional matches.

25 Claims, 14 Drawing Sheets

Related U.S. Application Data filed on May 16, 2019, provisional application No. 62/848,784, filed on May 16, 2019, provisional application No. 62/848,797, filed on May 16, 2019.

(52) U.S. Cl.
CPC ...... *G06T 7/70* (2017.01); *G06T 2207/20081* (2013.01); *G06T 2207/20084* (2013.01); *G06T 2207/30244* (2013.01)

(58) Field of Classification Search
CPC . G06T 2207/20084; G06T 2207/30244; G06T 2207/20081; G06T 7/74; G06N 3/02
See application file for complete search history.

(56) References Cited

U.S. PATENT DOCUMENTS

| | | |
|---|---|---|
| 2010/0284621 A1 | 11/2010 | Goncalves et al. |
| 2014/0279790 A1 | 9/2014 | Ramachandran et al. |
| 2015/0243080 A1 | 8/2015 | Steinbach et al. |
| 2017/0102772 A1 | 4/2017 | Hesch et al. |
| 2018/0161986 A1 | 6/2018 | Kee et al. |
| 2018/0165831 A1* | 6/2018 | Kwant ................ G05D 1/0251 |
| 2018/0189327 A1 | 7/2018 | Abu-Alqumsan et al. |
| 2019/0005670 A1* | 1/2019 | DeTone ................ G06T 7/593 |
| 2019/0062863 A1 | 2/2019 | Luo et al. |
| 2019/0066330 A1 | 2/2019 | Luo et al. |
| 2019/0087975 A1* | 3/2019 | Versace ................ G06T 7/70 |
| 2019/0122380 A1* | 4/2019 | Cao ................ G06K 9/6202 |
| 2019/0147221 A1* | 5/2019 | Grabner ................ G06T 7/75 382/103 |
| 2019/0147245 A1* | 5/2019 | Qi ................ G06K 9/3233 382/103 |
| 2019/0206084 A1* | 7/2019 | Noble ................ H04N 5/247 |
| 2019/0303725 A1* | 10/2019 | Gurvich ............. G06K 9/00664 |
| 2020/0311855 A1* | 10/2020 | Tremblay ............. G06K 9/6202 |
| 2020/0364509 A1* | 11/2020 | Weinzaepfel ............ G06N 3/02 |
| 2020/0364554 A1* | 11/2020 | Wang ................ G06N 3/0454 |
| 2020/0401617 A1* | 12/2020 | Spiegel ................ G06F 16/587 |

OTHER PUBLICATIONS

Brachmann, Eric, Alexander Krull, Sebastian Nowozin, Jamie Shotton, Frank Michel, Stefan Gumhold, and Carsten Rother. 'DSAC—Differentiable RANSAC for Camera Localization'. In 2017 IEEE Conference on Computer Vision and Pattern Recognition (CVPR), 2492-2500. Honolulu, HI: IEEE, 2017. https://doi.org/10.1109/CVPR.2017.267. 2017.
Brachmann, Eric, and Carsten Rother. 'Learning Less Is More—6D Camera Localization via 3D Surface Regression'. In 2018 IEEE/CVF Conference on Computer Vision and Pattern Recognition, 4654-62. Salt Lake City, UT: IEEE, 2018. https://doi.org/10.1109/CVPR.2018.00489. 2018.
Brahmbhatt, Samarth, Jinwei Gu, Kihwan Kim, James Hays, and Jan Kautz. 'Geometry-Aware Learning of Maps for Camera Localization'. In 2018 IEEE/CVF Conference on Computer Vision and Pattern Recognition, 2616-25. Salt Lake City, UT, USA: IEEE, 2018. https://doi.org/10.1109/CVPR.2018.00277. 2018.
Camposeco, Federico, Andrea Cohen, Marc Pollefeys, and Torsten Sattler. 'Hybrid Camera Pose Estimation'. In 2018 IEEE/CVF Conference on Computer Vision and Pattern Recognition, 136-44. Salt Lake City, UT, USA: IEEE, 2018. https://doi.org/10.1109/CVPR.2018.00022. 2018.
Castle, R., G. Klein, and D. W. Murray. 'Video-Rate Localization in Multiple Maps for Wearable Augmented Reality'. In 2008 12th IEEE International Symposium on Wearable Computers, 15-22, 2008. https://doi.org/10.1109/ISWC.2008.4911577. 2008.
Clark, Ronald, Sen Wang, Andrew Markham, Niki Trigoni, and Hongkai Wen. 'VidLoc: A Deep Spatio-Temporal Model for 6-DoF Video-Clip Relocalization'. In 2017 IEEE Conference on Computer Vision and Pattern Recognition (CVPR), 2652-60. Honolulu, HI: IEEE, 2017. https://doi.org/10.1109/CVPR.2017.284. 2017.
Cummins, Mark, and Paul Newman. 'FAB-MAP: Probabilistic Localization and Mapping in the Space of Appearance'. The International Journal of Robotics Research 27, No. 6 (Jun. 2008): 647-65. https://doi.org/10.1177/0278364908090961. 2008.
Güler, R. A., N. Neverova, and I. Kokkinos. 'DensePose: Dense Human Pose Estimation in the Wild'. In 2018 IEEE/CVF Conference on Computer Vision and Pattern Recognition, 7297-7306, 2018. https://doi.org/10.1109/CVPR.2018.00762. 2018.
Hao, Q., R. Cai, Z. Li, L. Zhang, Y. Pang, and F. Wu. '3D Visual Phrases for Landmark Recognition'. In 2012 IEEE Conference on Computer Vision and Pattern Recognition, 3594-3601, 2012. https://doi.org/10.1109/CVPR.2012.6248104. 2012.
He, K., G. Gkioxari, P. Dollar, and R. Girshick. 'Mask R-CNN'. In 2017 IEEE International Conference on Computer Vision (ICCV), 2980-88, 2017. https://doi.org/10.1109/ICCV.2017.322. 2017.
He, Kaiming, Xiangyu Zhang, Shaoqing Ren, and Jian Sun. 'Deep Residual Learning for Image Recognition'. In 2016 IEEE Conference on Computer Vision and Pattern Recognition (CVPR), 770-78. Las Vegas, NV, USA: IEEE, 2016. https://doi.org/10.1109/CVPR.2016.90. 2016.
Hu, Ronghang, Piotr Dollar, Kaiming He, Trevor Darrell, and Ross Girshick. 'Learning to Segment Every Thing'. In 2018 IEEE/CVF Conference on Computer Vision and Pattern Recognition, 4233-41. Salt Lake City, UT, USA: IEEE, 2018. https://doi.org/10.1109/CVPR.2018.00445. 2018.
Hutchison, David, Takeo Kanade, Josef Kittler, Jon M. Kleinberg, Friedemann Mattern, John C. Mitchell, Moni Naor, et al. 'Location Recognition Using Prioritized Feature Matching'. In Computer Vision—ECCV 2010, edited by Kostas Daniilidis, Petros Maragos, and Nikos Paragios, 6312:791-804. Berlin, Heidelberg: Springer Berlin Heidelberg, 2010. https://doi.org/10.1007/978-3-642-15552-9_57. 2010.
Kendall, A., and R. Cipolla. 'Modelling Uncertainty in Deep Learning for Camera Relocalization'. In 2016 IEEE International Conference on Robotics and Automation (ICRA), 4762-69, 2016. https://doi.org/10.1109/ICRA.2016.7487679. 2016.
Kendall, Alex, and Roberto Cipolla. 'Geometric Loss Functions for Camera Pose Regression with Deep Learning'. In 2017 IEEE Conference on Computer Vision and Pattern Recognition (CVPR), 6555-64. Honolulu, HI: IEEE, 2017. https://doi.org/10.1109/CVPR.2017.694. 2017.
Kendall, Alex, Matthew Grimes, and Roberto Cipolla. 'PoseNet: A Convolutional Network for Real-Time 6-DOF Camera Relocalization'. In 2015 IEEE International Conference on Computer Vision (ICCV), 2938-46. Santiago, Chile: IEEE, 2015. https://doi.org/10.1109/ICCV.2015.336. 2015.
Li, Yunpeng, Noah Snavely, Dan Huttenlocher, and Pascal Fua. 'Worldwide Pose Estimation Using 3D Point Clouds', n.d., 14. 2018.
Lin, Tsung-Yi, Piotr Dollar, Ross Girshick, Kaiming He, Bharath Hariharan, and Serge Belongie. 'Feature Pyramid Networks for Object Detection'. In 2017 IEEE Conference on Computer Vision and Pattern Recognition (CVPR), 936-44. Honolulu, HI: IEEE, 2017. https://doi.org/10.1109/CVPR.2017.106. 2017.
Long, Jonathan, Evan Shelhamer, and Trevor Darrell. 'Fully Convolutional Networks for Semantic Segmentation', n.d., 10. 2018.
Lowe, David G. 'Distinctive Image Features from Scale-Invariant Keypoints'. International Journal of Computer Vision 60, No. 2 (Nov. 2004): 91-110. https://doi.org/10.1023/B:VISI.0000029664.99615.94. 2004.
Lynen, Simon, Torsten Sattler, Michael Bosse, Joel Hesch, Marc Pollefeys, and Roland Siegwart. 'Get Out of My Lab: Large-Scale, Real-Time Visual-Inertial Localization'. In Robotics: Science and

(56) References Cited

OTHER PUBLICATIONS

Systems XI. Robotics: Science and Systems Foundation, 2015. https://doi.org/10.15607/RSS.2015.XI.037. 2015.

Melekhov, Iaroslav, Juha Ylioinas, Juho Kannala, and Esa Rahtu. 'Image-Based Localization Using Hourglass Networks'. In 2017 IEEE International Conference on Computer Vision Workshops (ICCVW), 870-77. Venice: IEEE, 2017. https://doi.org/10.1109/ICCVW.2017.107. 2017.

Moulon, Pierre, Pascal Monasse, and Renaud Marlet. 'Global Fusion of Relative Motions for Robust, Accurate and Scalable Structure from Motion'. In 2013 IEEE International Conference on Computer Vision, 3248-55. Sydney, Australia: IEEE, 2013. https://doi.org/10.1109/ICCV.2013.403. 2013.

Ren, Shaoqing, Kaiming He, Ross Girshick, and Jian Sun. 'Faster R-CNN: Towards Real-Time Object Detection with Region Proposal Networks'. In Advances in Neural Information Processing Systems 28, edited by C. Cortes, N. D. Lawrence, D. D. Lee, M. Sugiyama, and R. Garnett, 91-99. Curran Associates, Inc., 2015. http://papers.nips.cc/paper/5638-faster-r-cnn-towards-real-time-object-detection-with-region-proposal-networks.pdf. 2015.

Sattler, T., B. Leibe, and L. Kobbelt. 'Efficient Effective Prioritized Matching for Large-Scale Image-Based Localization'. IEEE Transactions on Pattern Analysis and Machine Intelligence 39, No. 9 (Sep. 2017): 1744-56. https://doi.org/10.1109/TPAMI.2016.2611662. 2017.

Sattler, Torsten, Bastian Leibe, and Leif Kobbelt. 'Improving Image-Based Localization by Active Correspondence Search'. In Computer Vision—ECCV 2012, edited by Andrew Fitzgibbon, Svetlana Lazebnik, Pietro Perona, Yoichi Sato, and Cordelia Schmid, 7572:752-65. Berlin, Heidelberg: Springer Berlin Heidelberg, 2012. https://doi.org/10.1007/978-3-642-33718-5_54. 2012.

Sattler, Torsten, Akihiko Torii, Josef Sivic, Marc Pollefeys, Hajime Taira, Masatoshi Okutomi, and Tomas Pajdla. 'Are Large-Scale 3D Models Really Necessary for Accurate Visual Localization?' In 2017 IEEE Conference on Computer Vision and Pattern Recognition (CVPR), 6175-84. Honolulu, HI: IEEE, 2017. https://doi.org/10.1109/CVPR.2017.654. 2017.

Schindler, G., M. Brown, and R. Szeliski. 'City-Scale Location Recognition'. In 2007 IEEE Conference on Computer Vision and Pattern Recognition, 1-7, 2007. https://doi.org/10.1109/CVPR.2007.383150. 2007.

Shotton, Jamie, Ben Glocker, Christopher Zach, Shahram Izadi, Antonio Criminisi, and Andrew Fitzgibbon. 'Scene Coordinate Regression Forests for Camera Relocalization in RGB-D Images'. In 2013 IEEE Conference on Computer Vision and Pattern Recognition, 2930-37. Portland, OR, USA: IEEE, 2013. https://doi.org/10.1109/CVPR.2013.377. 2013.

Sun, Xun, Yuanfan Xie, Pei Luo, and Liang Wang. 'A Dataset for Benchmarking Image-Based Localization', n.d., 9. 2018.

Svarm, Linus, Olof Enqvist, Magnus Oskarsson, and Fredrik Kahl. 'Accurate Localization and Pose Estimation for Large 3D Models'. In 2014 IEEE Conference on Computer Vision and Pattern Recognition, 532-39. Columbus, OH, USA: IEEE, 2014. https://doi.org/10.1109/CVPR.2014.75. 2014.

Torii, Akihiko, Josef Sivic, Masatoshi Okutomi, and Tomas Pajdla. 'Visual Place Recognition with Repetitive Structures'. IEEE Transactions on Pattern Analysis and Machine Intelligence, 2015, 15. 2015.

Torii, Akihiko, Josef Sivic, and Tomas Pajdla. 'Visual Localization by Linear Combination of Image Descriptors'. In 2011 IEEE International Conference on Computer Vision Workshops (ICCV Workshops), 102-9. Barcelona, Spain: IEEE, 2011. https://doi.org/10.1109/ICCVW.2011.6130230. 2011.

Valentin, Julien, Matthias Niebner, Jamie Shotton, Andrew Fitzgibbon, Shahram Izadi, and Philip Torr. 'Exploiting Uncertainty in Regression Forests for Accurate Camera Relocalization'. In 2015 IEEE Conference on Computer Vision and Pattern Recognition (CVPR), 4400-4408. Boston, MA, USA: IEEE, 2015. https://doi.org/10.1109/CVPR.2015.7299069. 2015.

Walch, F., C. Hazirbas, L. Leal-Taixe, T. Sattler, S. Hilsenbeck, and D. Cremers. 'Image-Based Localization Using LSTMs for Structured Feature Correlation'. In 2017 IEEE International Conference on Computer Vision (ICCV), 627-37. Venice: IEEE, 2017. https://doi.org/10.1109/ICCV.2017.75. 2017.

Xie, Saining, Ross Girshick, Piotr Dollar, Zhuowen Tu, and Kaiming He. 'Aggregated Residual Transformations for Deep Neural Networks'. In 2017 IEEE Conference on Computer Vision and Pattern Recognition (CVPR), 5987-95. Honolulu, HI: IEEE, 2017. https://doi.org/10.1109/CVPR.2017.634. 2017.

Zeisl, Bernhard, Torsten Sattler, and Marc Pollefeys. 'Camera Pose Voting for Large-Scale Image-Based Localization'. In 2015 IEEE International Conference on Computer Vision (ICCV), 2704-12. Santiago, Chile: IEEE, 2015. https://doi.org/10.1109/ICCV.2015.310. 2015.

Zhang, W., and J. Kosecka. 'Image Based Localization in Urban Environments'. In Third International Symposium on 3D Data Processing, Visualization, and Transmission (3DPVT'06), 33-40, 2006. https://doi.org/10.1109/3DPVT.2006.80. 2006.

https://github.com/openMVG/openMVG 2018.

\* cited by examiner

SYSTEM AND METHOD FOR TRAINING A NEURAL NETWORK FOR VISUAL LOCALIZATION BASED UPON LEARNING OBJECTS-OF-INTEREST DENSE MATCH REGRESSION

PRIORITY INFORMATION

The present application claims priority, under 35 USC § 119(e), from U.S. Provisional Patent Application, Ser. No. 62/848,757, filed on May 16, 2019. The entire content of U.S. Provisional Patent Application, Ser. No. 62/848,757, filed on May 16, 2019, is hereby incorporated by reference.

The present application claims priority, under 35 USC § 119(e), from U.S. Provisional Patent Application, Ser. No. 62/848,771, filed on May 16, 2019. The entire content of U.S. Provisional Patent Application, Ser. No. 62/848,771, filed on May 16, 2019, is hereby incorporated by reference.

The present application claims priority, under 35 USC § 119(e), from U.S. Provisional Patent Application, Ser. No. 62/848,784, filed on May 16, 2019. The entire content of U.S. Provisional Patent Application, Ser. No. 62/848,784, filed on May 16, 2019, is hereby incorporated by reference.

The present application claims priority, under 35 USC § 119(e), from U.S. Provisional Patent Application, Ser. No. 62/848,797, filed on May 16, 2019. The entire content of U.S. Provisional Patent Application, Ser. No. 62/848,797, filed on May 16, 2019, is hereby incorporated by reference.

BACKGROUND

Information about the location, orientation, and context of a mobile device is important for future multimedia applications and location-based services. With the widespread adoption of modern camera phones, including powerful processors, inertial measurement units, compass, and assisted global-positioning satellite receivers, the variety of location and context-based services has significantly increased over the last years. These include, for instance, the search for points of interest in the vicinity, geo tagging and retrieval of user generated media, targeted advertising, navigation systems, social applications etc.

To generate the information about the location, orientation, and context of a mobile device, systems have relied upon computer vision. Computer vision is a field of endeavor which enables computers to obtain (calculate) aspects or characteristics of a surrounding environment from digital images or videos. Thus, one product of computer vision is the ability of a computer, such as a robot, to determine its location in a surrounding environment, to localize itself, based upon an analysis of visual images received from the surrounding environment (visual localization).

Various challenges to visual localization, in the context of a mobile device, are large viewpoint changes between query and training images, incomplete maps, regions without valuable information (e.g. textureless surfaces), symmetric and repetitive elements, changing lighting conditions, structural changes, dynamic objects (e.g. people), and scalability to large areas.

This particular challenge of visual localization is even more relevant in very large and dynamic environments. When encountering very large and dynamic environments, essential assumptions, such as static and unchanged scenes, can be violated and the maps can become outdated quickly. Although retraining of the visual localization process can address some of these issues, continuous retraining of the visual localization process presents other challenges.

Conventionally, visual localization can be categorized into four types of approaches: structure-based methods, image retrieval-based methods, pose regression-based methods, and scene coordinate regression-based methods.

A conventional structure-based method uses descriptor matching (e.g. scale-invariant feature transform) between three-dimensional points of the map associated with local descriptors and key point descriptors in the query image.

However, these point features of a structure-based method are not able to create a representation which is sufficiently robust to challenging real-world scenarios such as different weather, lighting, or environmental conditions. Additionally, structure-based methods lack the ability to capture global context and require robust aggregation of hundreds of points in order to form a consensus to predict a pose.

A conventional image retrieval-based method matches the query image with the images of the map using global descriptors or visual words, to obtain the image location from the top retrieved images. The retrieved locations can further be used to either limit the search range within large maps of structure-based approaches or to directly compute the pose between retrieved and query images While an image retrieval-based method can speed-up search in large environments, an image retrieval-based method shares similar drawbacks (not able to create a representation which is sufficiently robust to challenging real-world scenarios, lack the ability to capture global context, and/or require robust aggregation of hundreds of points in order to form a consensus to predict a pose) when using structure-based methods for accurate pose computation.

A conventional pose regression-based method is a deep learning approach trained end-to-end for visual localization. Pose regression-based methods proceed by directly regressing the six degrees of freedom camera pose from the query image using a convolutional neural network.

Moreover, a pose regression-based method may leverage video information, recurrent neural networks, hourglass architecture, or a Bayesian convolutional neural network to determine the uncertainty of the localization.

However, although pose regression-based methods have shown robustness to many challenges, the pose regression-based method is limited both in accuracy and scale.

One conventional scene coordinate regression-based method regresses dense three-dimensional coordinates and estimating the pose using a perspective-n-point solver with a random sample consensus. Another conventional scene coordinate regression-based method regresses dense three-dimensional coordinates and estimating the pose using a perspective-n-point solver with a differential approximation of a random sample consensus.

Although the conventional scene coordinate regression-based methods perform well on datasets of relatively small scale with constant lighting conditions and static scene, the conventional scene coordinate regression-based methods fail to scale up to larger environments and to accurately regress three-dimensional coordinates in textureless areas or for repetitive patterns.

Therefore, it is desirable to provide a visual localization process method that results in precise localization and long-term stability in very vivid scenarios.

Moreover, it is desirable to provide a visual localization process method which is robust to real-world scenarios such as different weather, lighting or environmental conditions.

In addition, it is desirable to provide a visual localization process method that is able to capture global context and not require robust aggregation of hundreds of points in order to form a consensus to predict a pose.

Furthermore, it is desirable to provide a visual localization process method that is able to scale up to larger environments and to accurately regress three-dimensional coordinates in textureless areas or for repetitive patterns.

BRIEF DESCRIPTION OF THE DRAWINGS

The drawings are only for purposes of illustrating various embodiments and are not to be construed as limiting, wherein.

DETAILED DESCRIPTION OF THE DRAWING

In the description below, an object-of-interest is a discriminative area within a three-dimensional map which can be reliably detected from multiple viewpoints, partly occluded, and under various lighting conditions.

Figure 1:
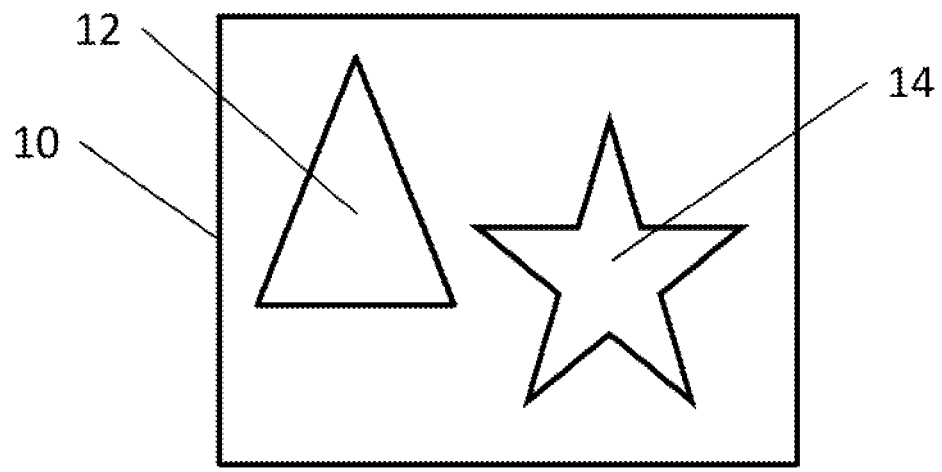
FIG. 1 illustrates an example of query image.

FIG. 1 illustrates an example of query image 10. As illustrated in FIG. 1, the query image 10 includes two objects-of-interest (12 and 14).

Figure 2:
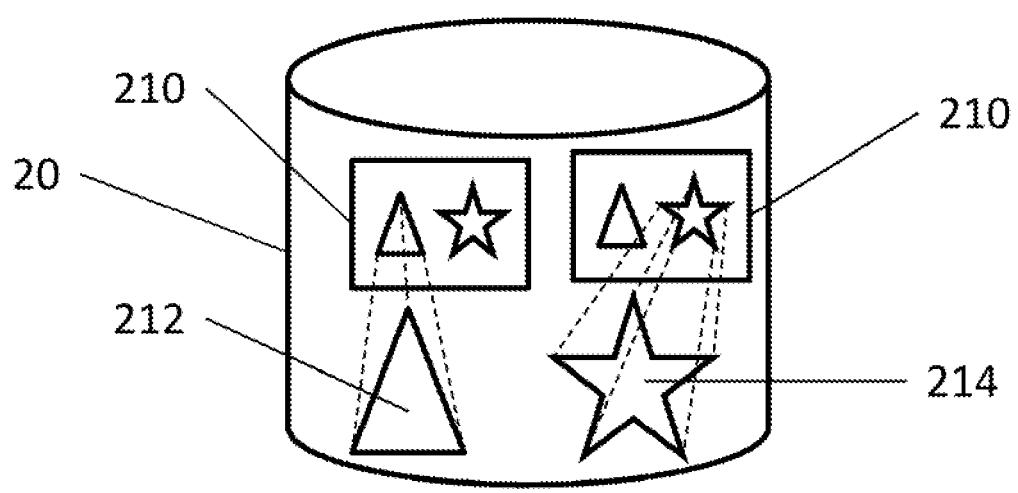
FIG. 2 illustrates a database of reference images of objects-of-interest mapped to a three-dimensional mapping.

FIG. 2 illustrates a block diagram of a database 20 of reference images (212 and 214) corresponding to objects-of-interest (i.e., two-dimensional to three-dimensional correspondences). As illustrated in FIG. 2, pixels of each two-dimensional reference image of the objects-of-interest (212 and 214) in the database 20 are mapped to a three-dimensional coordinate mapping 210.

Figure 3:
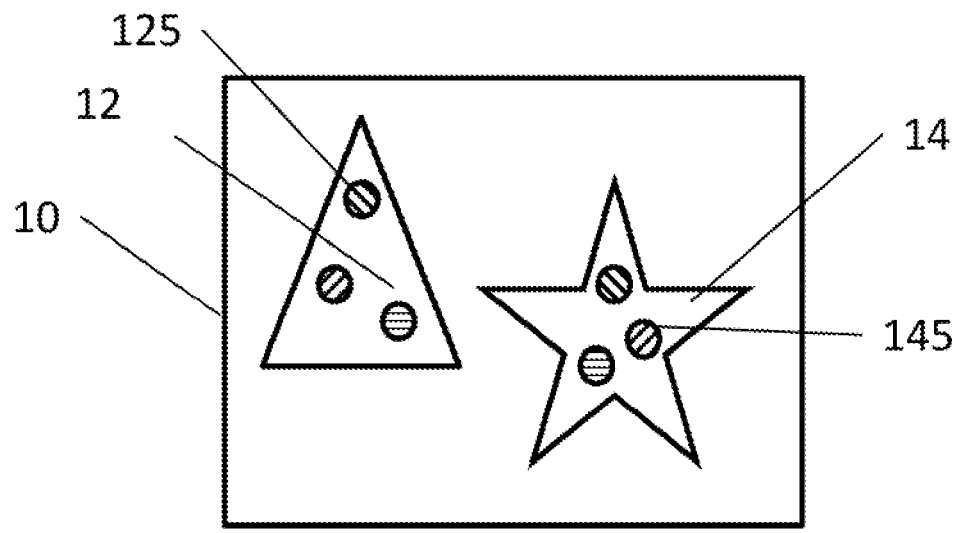
FIG. 3 illustrates an example of dense points for the objects-of-interest in the query image.

FIG. 3 is an example of dense points for the objects-of-interest in the query image 10. As illustrated in FIG. 3, the objects-of-interest (12 and 14) include dense points (125 and 145). The dense points (125 and 145) are regressed dense matched to their corresponding reference images in the database, as illustrated in FIG. 4.

Figure 4:
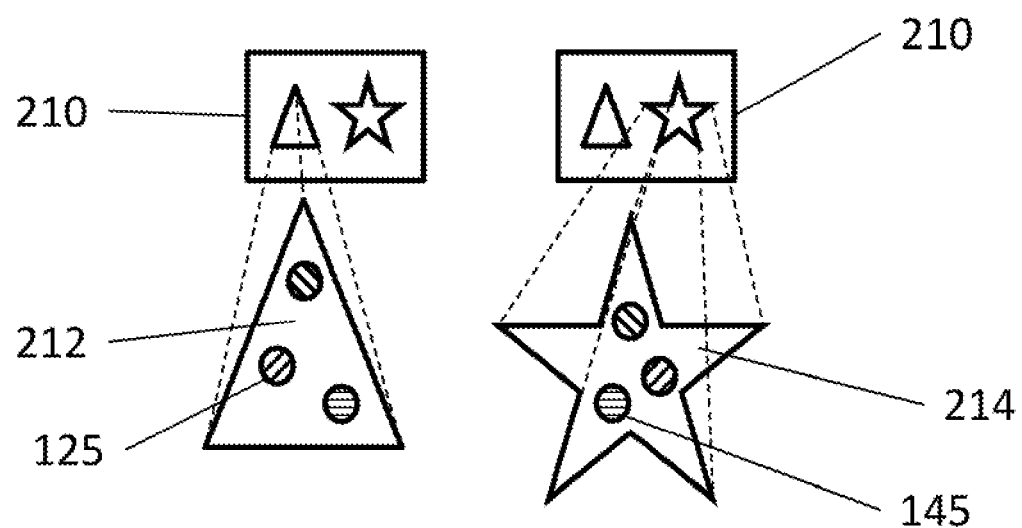
FIG. 4 illustrates an example of matched dense points for reference images of the objects-of-interest in the database.

More specifically, as illustrated in FIG. 4, regressed dense matches correspond to dense points (125 and 145) of the objects-of-interest in the query image and the corresponding reference images, for which the database of reference images contains dense two-dimensional pixel to three-dimensional coordinates mapping. The two-dimensional to three-dimensional matches are realized by transitivity.

Figure 5:
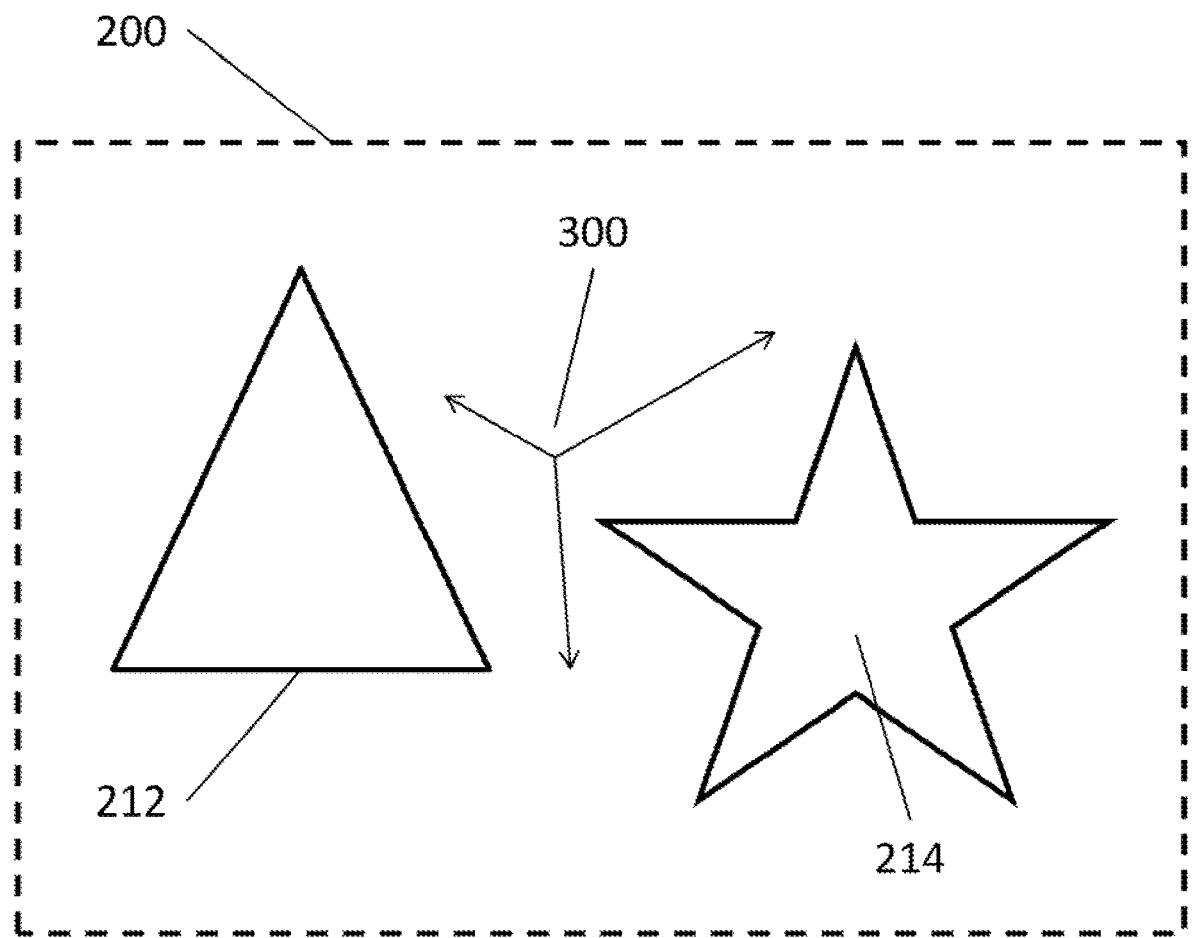
FIG. 5 illustrates an example of a result of solving a perspective-n-point problem to obtain camera localization.

FIG. 5 illustrates a result, using the two-dimensional to three-dimensional matches, of solving a perspective-n-point problem to obtain camera localization 300 with respect to objects-of-interest (212 and 214) in an environment of interest 200.

As illustrated in FIG. 1 through FIG. 5, objects-of-interest in the query image are detected and segmented. From the detected and segmented objects-of-interest in the query image a dense set of two-dimensional to two-dimensional matches between the detected objects-of-interest in the query image and their reference images in the database is obtained. Given these two-dimensional to two-dimensional matches, together with the two-dimensional to three-dimensional correspondences of the reference images, a set of two-dimensional to three-dimensional matches is obtained from which camera localization is obtained by solving a perspective-n-point problem.

To realize the visual localization from the detected objects-of-interest, let O be the set of objects-of-interest, and |O| the number of objects-of-interest classes. For reference images: each object-of-interest $o \in O$ is associated to a canonical view, i.e., an image $I_o$ where o is fully visible. Each object-of-interest is assumed to be unique in the environment and that the mapping $M_o$ between two-dimensional pixels $p^I$ in the reference image and the corresponding three-dimensional points in the world $M_o(p^I)$ is known.

Given a query image, a convolutional neural network outputs a list of detections. Each detection consists of: (a) a bounding box with a class label o, i.e., the identifier of the detected object-of-interest and a confidence score; (b) a segmentation mask; and (c) a set of two-dimensional to two-dimensional matches $\{q \rightarrow q^I\}$ between pixels q in the query image and pixels $q^I$ in the reference image $I_o$ of the object-of-interest o, as illustrated in FIGS. 1-5. By transitivity, the mapping $M_o$ is applied to the matched pixels in the reference image, and for each detection, a list of matches between two-dimensional pixels in the query image and three-dimensional points in the world coordinates is obtained: $\{q \rightarrow M_o(q)\}$.

Given the list of two-dimensional to three-dimensional matches for all detections in the query image and the intrinsic camera parameters, a six degree of freedom camera pose is estimated by solving a perspective-n-point problem using random sample consensus.

It is noted that if there is no detection in the query image (no matches), localization cannot be performed. However, in venues, such as museums or airports, there is an object-of-interest in most images. Moreover, in real-world applications, localization is used in conjunction with local pose tracking, and thus precision of the system takes precedence over coverage.

In summary, the only component learned in the above approach is the detector and dense matching between an image and the reference images of the objects-of-interest present in the image.

In the above process, it was assumed that each object-of-interest was unique; i.e., each object-of-interest appears only once in the environment. While objects-of-interest are highly discriminative, there can be multiple instances of each one; e.g., for logos in a shopping mall.

In this case, as a detector cannot differentiate multiple instances of an object-of-interest, the same logos are summarized in a single class, and the model is trained with a common reference image of the object-of-interest. However, the mapping $M_o$ is not unique anymore since there exist multiple three-dimensional coordinate candidates for the same reference image; i.e., one per instance in the environment.

Given a limited number of duplicates per object-of-interest in practice and a limited number of detections per image, the perspective-n-point problem is solved for the best combination of possible coordinates. Geometric plausibility checks are applied to rank the possible combinations. More specifically, the sum of re-projection errors of the object-of-interest three-dimensional center points in the query image is minimized. Ideally, the three-dimensional center point lies in the middle of the segmented detection.

Figure 6:
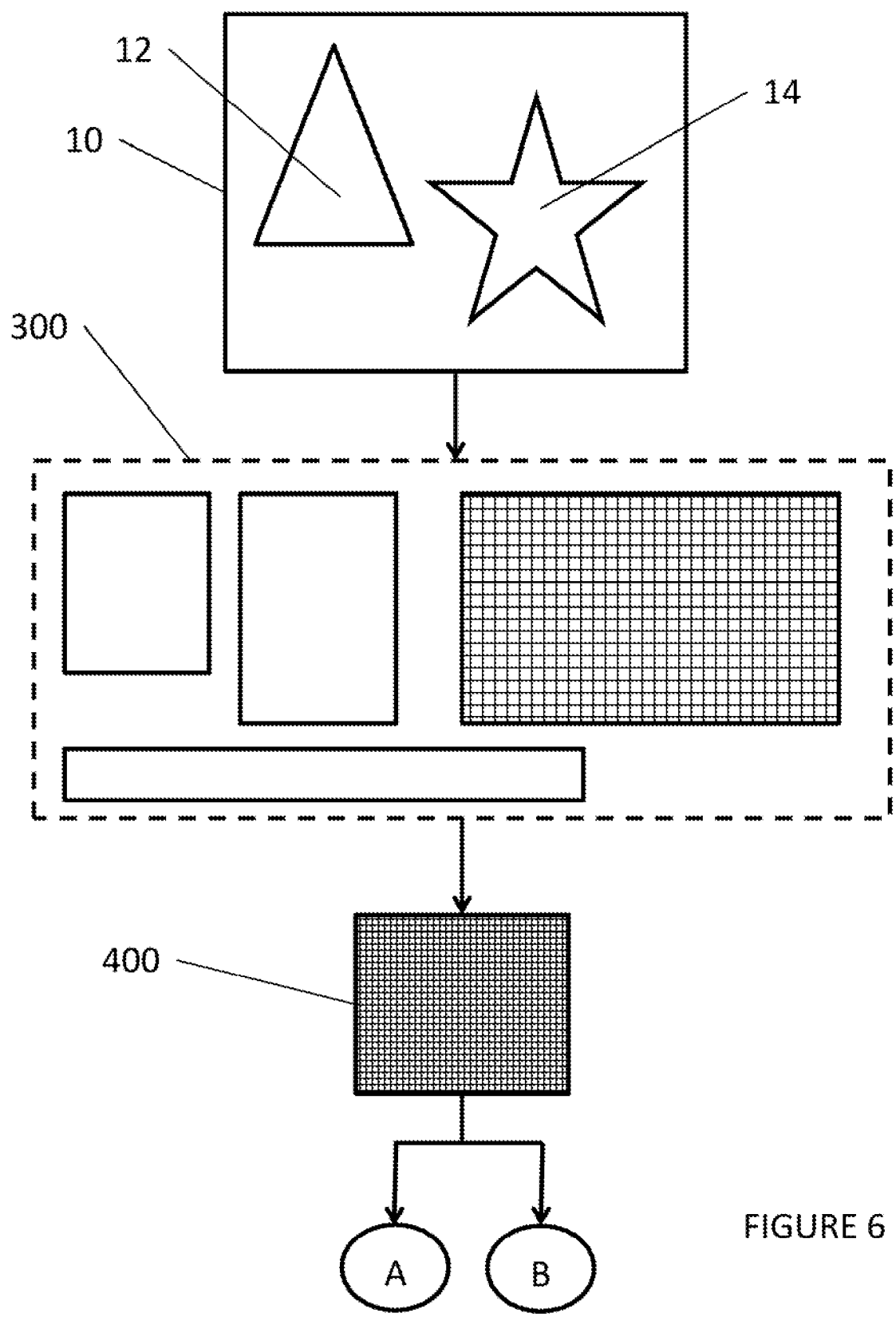
FIGS. 6 and 7 illustrate a network architecture to detect and segment objects-of-interest in a query image and dense match with respect to reference images.
Figure 7:
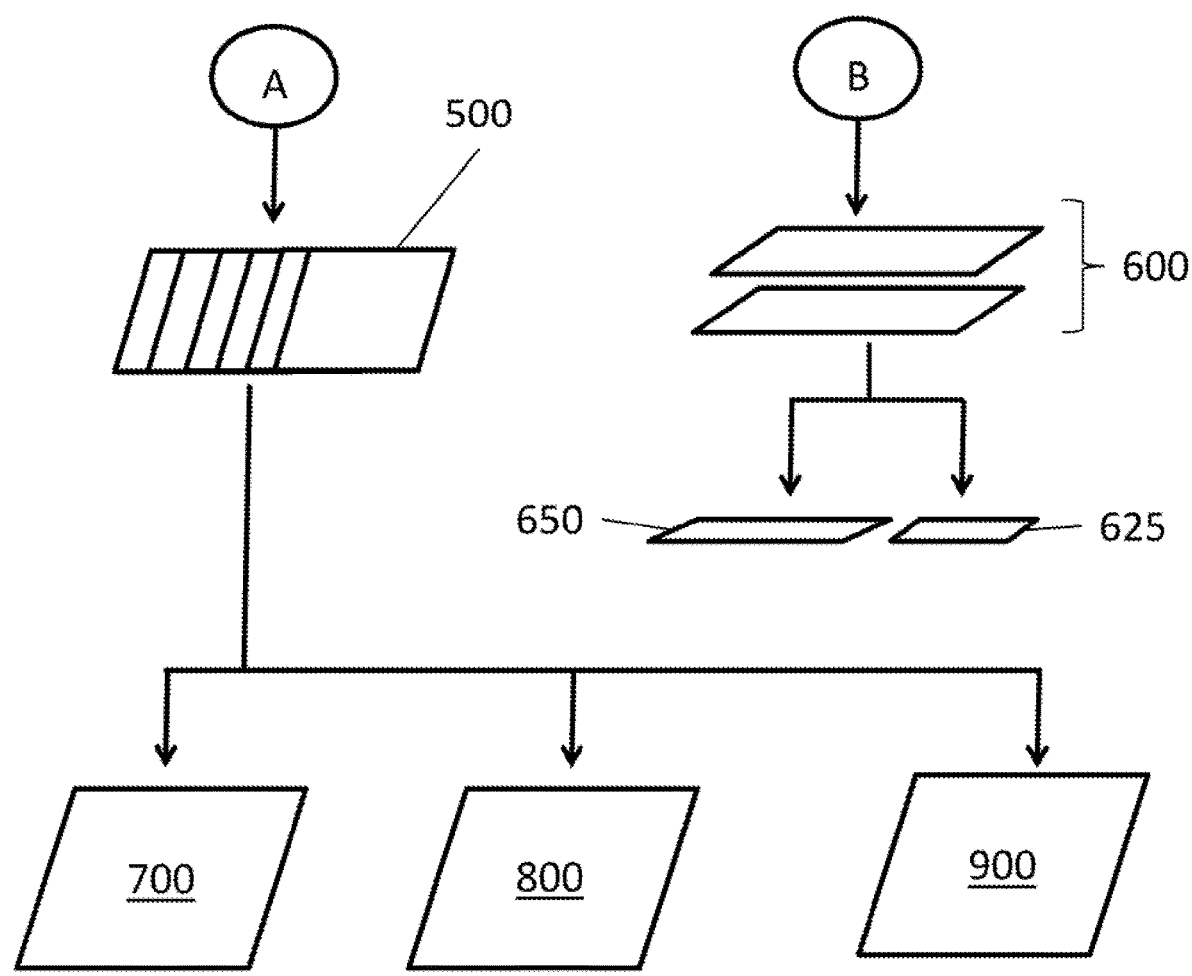

FIGS. 6 and 7 illustrate network architecture to detect and segment objects-of-interest in a query image and dense match with respect to reference images. As illustrated in FIG. 6, in detecting objects-of-interest in a query image, the query image 10, with objects-of-interest (12 and 14), is processed by region proposal networks.

In other words, the query image 10, with objects-of-interest (12 and 14), goes through a convolution neural network which outputs a set of convolutional feature maps on the last convolutional layer.

Then a sliding window is run spatially on these feature maps. To clarify how the results of the sliding window running spatially on the feature maps are obtained, a set of p×q anchor boxes are generated for each pixel. Each of the p×q generated anchor boxes has the same center (xa,ya) but with p different aspect ratios and q different scales. In other words, if the results of the sliding window running spatially on the feature maps created a set of four (p×q) generated anchor boxes, the set of four (p×q) generated anchor boxes would include a first generated anchor box having a first aspect ratio and a first scale; (2) a second generated anchor box having the first aspect ratio and a second scale (the first scale being different from the second scale); (3) a third generated anchor box having a second aspect ratio (the first aspect ratio being different from the second aspect ratio) and the first scale; and (4) a fourth generated anchor box having the second aspect ratio and the second scale. It is noted that these coordinates are computed with respect to the query image.

The spatial features extracted from the convolution feature maps are fed to a smaller network which has two tasks: classification and regression. The output of regressor determines a predicted bounding-box (x,y,w,h). The output of the classification sub-network is a |O|+1 dimensional vector where the value of each dimension is the probability that the predicted box contains a given object-of-interest and the value of the last dimension indicates the probability of not containing any objects-of-interest, i.e. only background, wherein |O| is the number of objects-of-interest classes.

For each box (proposal) 300 generated by the region proposal networks, C-dimensional convolutional features are estimated with a fixed resolution using a RoIAlign layer 400. Box features are fed to two branches (A and B). In one embodiment, the regional proposal networks generate one thousand proposals.

Branch B, after being processed by a faster regional convolution neural network and a rectified linear unit (600 of FIG. 7), predicts the objects-of-interest scores (625 of FIG. 7) and per object-of-interest box regression (650 of FIG. 7).

Branch A, after being processed by a convolution neural network (500 of FIG. 7), a convolution neural network being a neural network composed of interleaving convolution layers and rectified linear units, predicts binary segmentation for each object-of-interest (700 of FIG. 7) and x and y reference image coordinates regression, with an object-of-interest specific regressor (800 and 900, respectively, of FIG. 7). In one embodiment, the convolution neural network predicts segmentation and correspondences on a dense grid of size 56×56 in each box which is then interpolated to obtain a per-pixel prediction.

The network of FIGS. 6 and 7, emulates DensePose, an extension of mask regional convolution neural network, to find dense correspondences between any point on an object of interest in a query image and the corresponding point on a reference image. For each box generated by the region proposal networks, C-dimensional convolutional features are estimated with a fixed resolution using RoIAlign (region of Interest align) layer. A feature pyramid network improvement is used in conjunction with the region proposal networks to better deal with small objects.

As noted above, Box features are fed to two branches (A and B). Branch B, predicts the objects-of-interest scores and per object-of-interest box regression, and Branch A predicts binary segmentation for each object-of-interest and x and y reference image coordinates regression.

In Branch B, there are |O|+1 classes, including the background class, instead of two classes used in DensePose.

At training time, several losses are combined. In addition to the feature pyramid network loss for box proposals, cross-entropy loss for box classification is used. For the ground-truth class, a smooth-L1 loss on its box regressor, the cross-entropy loss for the mask predictor, and smooth-L1 losses for the x- and y-regressors are used.

During training, each pixel has a ground-truth mask and matches. During testing, for example, the box detections with classification score over 0.5 and matches for the points within segmentation mask are kept.

In an embodiment of the visual localization process, a feature pyramid network is used with both ResNet50 and ResNeXt101-32x8d as backbone architecture. Branch A, which predicts segmentation and match regression, follows mask regional convolution neural network architecture, consisting of eight convolutions and rectified linear unit layers, before the layer for the final prediction of each task.

The network is trained for 500,000 iterations, starting with a learning rate of 0.00125 on one graphics processing unit, dividing the learning rate by 10 after 300,000 and 420,000 iterations. Stochastic gradient descent is utilized as an optimizer with a momentum of 0.9 and a weight decay of 0.001. To make all regressors proceeding at the same scale input, the reference coordinates are normalized to the range [0, 1] by dividing pixel values by the resolution of the reference images.

In an embodiment of the visual localization process, since the convolution neural network regresses matches only in two-dimensions, a homography data augmentation is applied on all input images. To generate plausible viewpoints, a random displacement, limited by 33% of the image size, is computed for each of the four corners and fit the corresponding homography.

In an embodiment of the visual localization process, color jittering (brightness, contrast, saturation) is used in some trainings for robustness against changing lighting conditions.

In another embodiment of the visual localization process, a minimal amount of manual annotations is required by using a propagation algorithm that leverages a structure-from-motion reconstruction (a set of three-dimensional points and their observations in camera images) obtained using an open multiple view geometry library or other models, e.g. a general-purpose structure-from-motion and multi-view stereo pipeline with a graphical and/or command-line interface.

Figure 8:
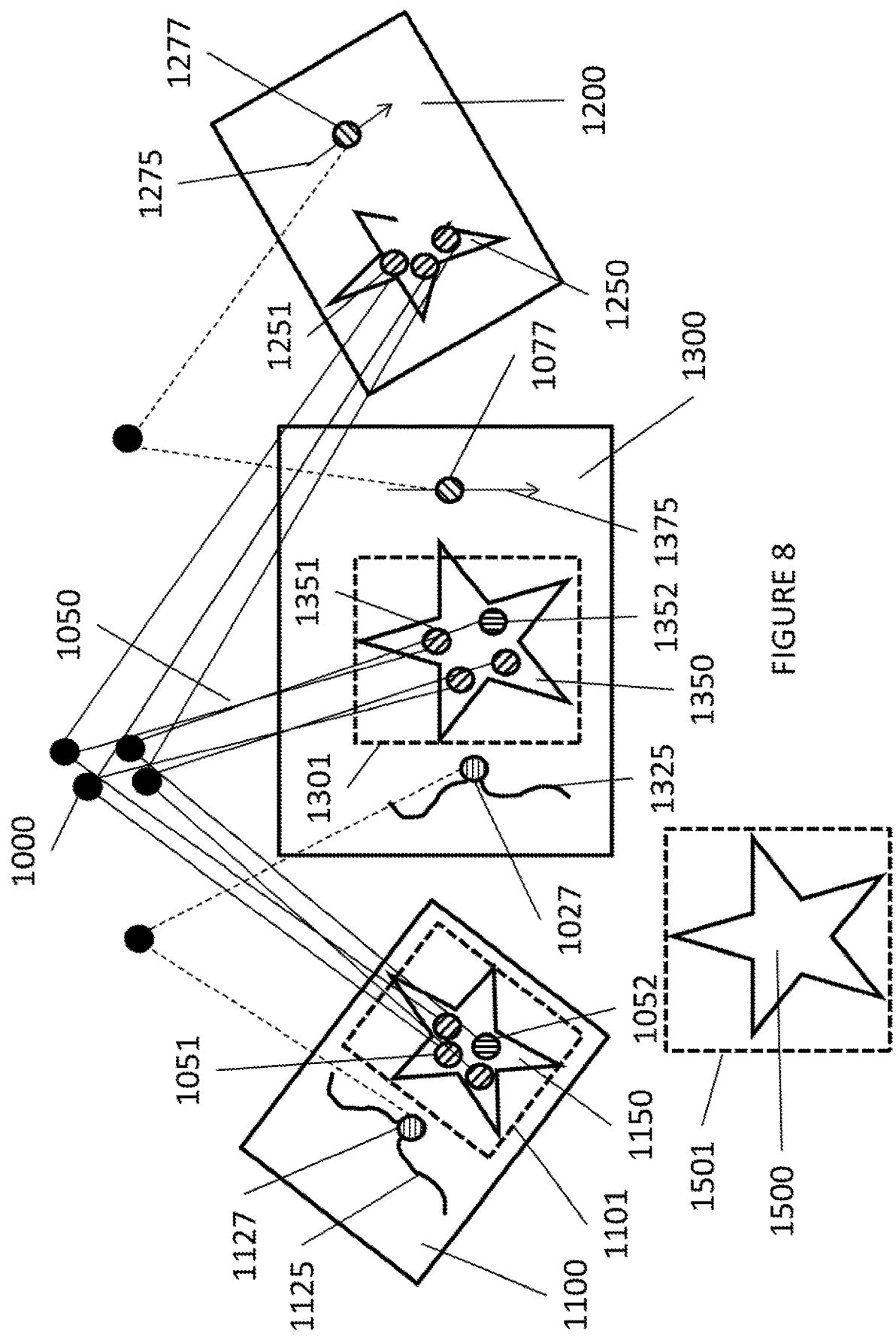
FIG. 8 illustrates an example of using a bounding box of a manual mask annotation to define a reference image to propagate three-dimensional positions of key points to other images in the training data.

FIG. 8 illustrates an example of using a bounding box of a manual mask annotation to define a reference image to propagate three-dimensional positions of key points to other images in the training data. In the example of FIG. 8, the only manual annotation provided is one segmentation mask for each planar object-of-interest.

As illustrated in FIG. 8, a bounding box of the manual mask annotation 1301 defines a reference image 1500 (with bounding box 1501) for an object-of-interest 1350 in a first frame of training data 1300.

Using structure-from-motion reconstruction, three-dimensional positions of key points 1351 in the manual mask annotation 1301 for the object-of-interest 1350 in the first frame of training data 1300 are obtained.

Upon obtaining the three-dimensional positions of key points 1351 in the manual mask annotation 1301 for the object-of-interest 1350 in the first frame of training data 1300, the bounding box of the manual mask annotation 1301 for the object-of-interest 1350 can be propagated to a second frame of training data 1100 to obtain a manual mask annotation 1101 for an object-of-interest 1150 in the second frame of training data 1100 if there are enough matches between key points 1351 of the first frame of training data 1300 and key points 1051 of the second frame of training data 1100.

On the other hand, as illustrated in FIG. 8, the bounding box of the manual mask annotation 1301 for the object-of-interest 1350 cannot be propagated to a third frame of training data 1200 to obtain a manual mask annotation for an object-of-interest 1250 in the third frame of training data 1200 because there are not enough matches between key points 1351 of the first frame of training data 1300 and key points 1251 of the third frame of training data 1200.

Using the set of two-dimensional to three dimensional matches from structure-from-motion reconstruction, three-dimensional points are labelled that match with two-dimensional pixels in the annotated object-of-interest segmentation, (illustrated in FIG. 8 by the four solid dots 1000 connected to the key points 1351, by lines 1050). The label can be propagated to all training images which contain observations of these three-dimensional points.

For example, if there are at least four such matches in an image (as illustrated in FIG. 8), given that the object-of-interest o is planar, a homography can be fitted.

For more robustness to noise, regions with a minimum of seven matches are only considered and a random sample consensus based homography estimation is used. As illustrated in FIG. 8, this homography is used to propagate the mask annotation 1301 of the first frame 1300 to mask annotation 1101 of the second frame 1100, as well as the dense two-dimensional to two-dimensional matches.

As illustrated in FIG. 8, the propagation may not be successful, due to a low number of matches leading to missing propagation. Moreover, the propagation may not be successful, due to noisy matches in the structure-from-motion reconstruction.

However, the convolution neural network architecture can be robust to noisy matches or missing labels.

For non-unique objects-of-interest, such as a logo appearing multiple times in a shopping mall, one segmentation mask for each instance of the object-of-interest is annotated, and the propagation method is applied on each instance independently.

As mentioned above, it would be difficult for any detector to differentiate between the different instances of the same object-of-interest. Thus, to overcome this issue, the different instances are merged into a single object-of-interest class, and a homography between the reference images of the different instances and the dedicated main reference image using scale-invariant feature transform descriptor matches is computed. The reference image with the highest number of three-dimensional matches represents the main reference image for the class.

Since the regressed two-dimensional to two-dimensional matches correspond to the main class, a perspective transform is applied, using the computed intra-class homographies. This class will have different mapping functions $M_o$ to the three-dimensional coordinates.

In one embodiment, to test the visual localization process and to measure the impact of varying lighting conditions and occlusions on different localization methods, a virtual model was used. Occlusions are objects; such as humans, which are dynamic and may appear in an image when determining localization in a real application The virtual model consisted of a scene containing three to four rooms, in which a total of forty-two images of paintings (objects-of-interest) are placed on the virtual walls. The virtual model and the captured images of paintings were generated with the Unity software, allowing the extraction of ground-truth information such as depth, semantic and instance segmentation, two-dimensional to two-dimensional correspondences, and two-dimensional to three-dimensional correspondences.

To train the visual localization network, training data is acquired by simulating the scene being captured by a robot and test data is acquired by simulating photos taken by visitors. A camera setup for the robot simulation consists of six cameras in a 360° configuration at a fixed height. To produce training data, the robot follows five different loops inside the virtual gallery with pictures taken at roughly the same predetermined interval which results in a number of images for each camera.

During testing, random positions, orientations, and focal lengths are sampled, ensuring that viewpoints (a) are plausible and realistic (in terms of orientation, height, and distance to a virtual wall in the virtual gallery), and (b) cover the entire scene. This adds the additional challenges of viewpoint changes and varying intrinsic camera parameters between training and test images.

To study robustness to lighting conditions, scenes are generated using six different lighting configurations with significant variations therebetween, both at training and test time.

To evaluate robustness to occluders, such as visitors, test images are generated, which contain randomly placed virtual human body models. The test set consists of a number of images that are rendered with each of the six lighting conditions, and for four different densities of virtual humans present in the scene (including the empty case).

Each image of a painting is an object-of-interest, wherein each image of a painting is unique in the scene. The original images of the paintings used to populate the virtual gallery are utilized as the reference images. Ground-truth segmentation masks and two-dimensional to two-dimensional correspondences for each image of a painting are obtained using Unity.

Also, the position and size where the image is placed in the scene is obtained, thus providing the two-dimensional to three-dimensional mapping function for each reference image.

Different train/test scenarios were used to evaluate variants of the visual localization network and to study the robustness of state-of-the-art approaches to lighting conditions and occlusions.

In a first train/test evaluation scenario (data augmentation), the impact of homography data augmentation at training was evaluated. The visual localization network was trained with a ResNet50 backbone, with and without data augmentation, using a standard lighting condition. The visual localization network was tested with standard lighting condition and no virtual human.

Figure 9:
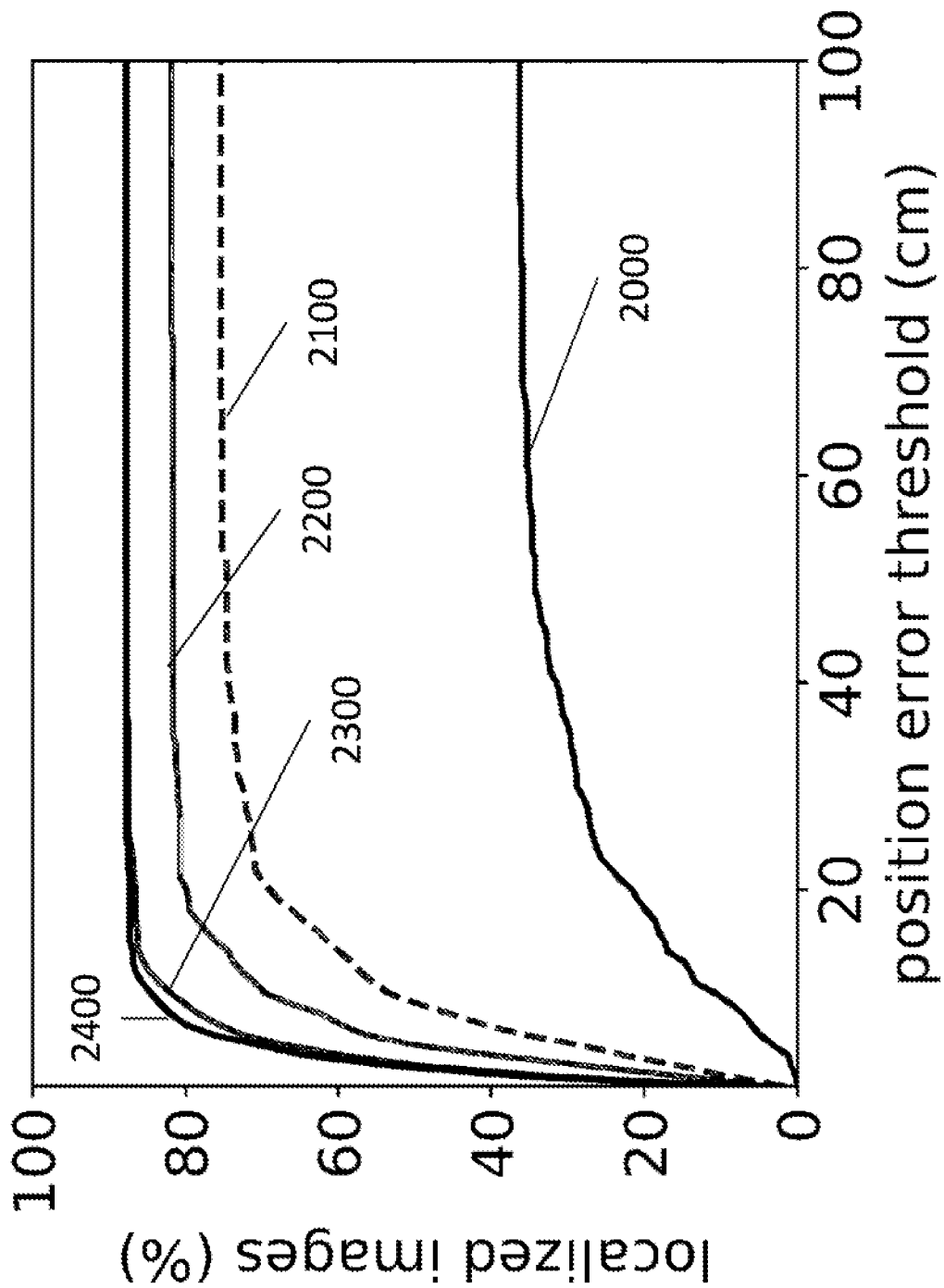
FIG. 9 graphically illustrates percentage results of localized images on a test set with a first lighting condition and a fixed angle error threshold of 5°.

FIG. 9 shows percentages of successfully localized images at different error thresholds. More specifically, line 2300 of FIG. 6 shows the percentages of successfully localized images at different error thresholds for the data augmentation scenario, and line 2100 of FIG. 9 shows the percentages of successfully localized images at different error thresholds for the non-data augmentation scenario.

As shown in FIG. 9, the data augmentation scenario significantly improves the performance, especially for highly accurate localization. More specifically, as illustrated in FIG. 9, the ratio of successfully localized images with 5 cm and 5° error threshold increases from 28% to 67%. The impact is less at higher error thresholds, with an improvement from 71% to 87% at 25 cm and 5°.

Based upon this evaluation, homography data augmentation, at training, allows the generation of more viewpoints of the objects-of-interest, and thus, enabling improved detection and matching of objects-of-interest at test time with novel viewpoints.

In a second train/test evaluation scenario (regressing dense two-dimensional to two-dimensional matches), eight degrees of freedom homography parameters (objects-of-interest-homography) between the detected object-of-interest and the reference image are regressed to generate a dense set of two-dimensional to two-dimensional matches. Next, three-dimensional world coordinates for each object-of-interest instance (object-of-interest-two-dimensional to three-dimensional) without using the reference image.

Performances with the same train/test protocol as described above with respect to data augmentation are shown in FIG. 9. As shown in FIG. 9, regressing the eight parameters of the homography performs quite poorly (line 2000), with only 22% of successfully localized images at 25 cm and 5°.

On the other hand, as shown in FIG. 9, the three-dimensional variant scenario (line 2200) performs reasonably well, with 50% of images localized with an error below 10 cm and 5°, and 81% below 25 cm and 5°.

Notwithstanding, the two-dimensional reference images scenario (line 2300) outperform the three-dimensional variant scenario (line 2200), especially for low position error threshold. This can be explained by the fact that the two-dimensional reference images scenario insures that all three-dimensional points are on the planar object, while the three-dimensional variant adds one extra and unnecessary degree of freedom.

In a third train/test evaluation scenario (using a ResNeXt101-32x8d backbone), the third train/test evaluation scenario (line 2400), as shown in FIG. 9, realizes a gain of about 3% for low error thresholds, but the improvement becomes marginal at higher threshold, such as 25 cm and 5°.

The above described training and use of the visual localization network of FIGS. 1-8 was compared with (1) a standard feature-based method that relies on structure-from-motion reconstruction, (2) PoseNet with geometric loss where the idea is basically to learn a convolution neural network to map images to camera pose, and (3) differentiable random sample consensus trained with a three-dimensional model, where the main idea is to train a convolution neural network to regress scene coordinate from which pose is estimated by solving a perspective-n-point problem with a random sample consensus methodology. In the evaluations, each system is trained on all loops for all lighting conditions and tested on all lighting conditions without human occlusion. The percentages of successfully localized images at a given error threshold are shown in FIG. 11.

Figure 11:
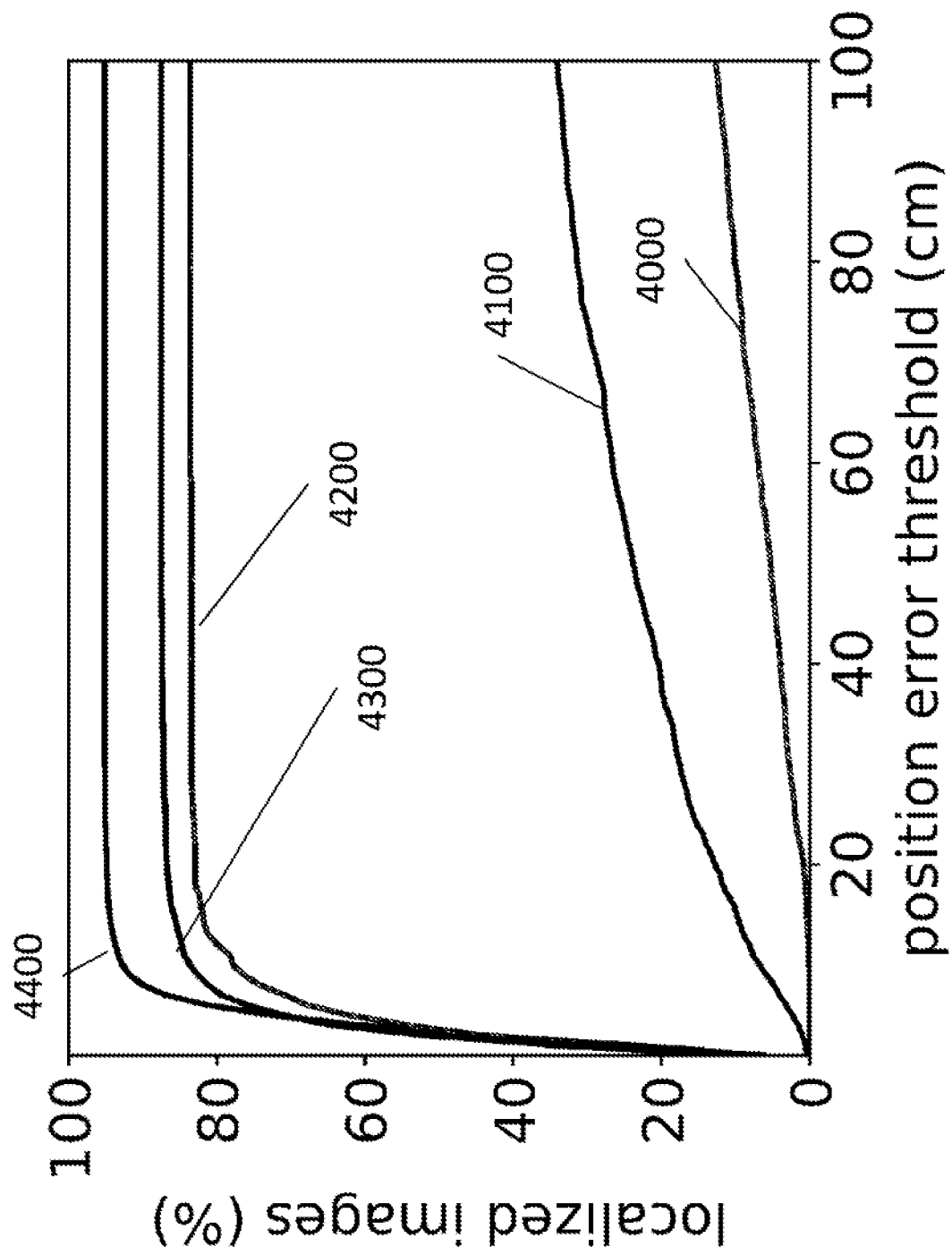

More specifically, as illustrated in FIG. 11, the percentages of successfully localized images at a given error threshold for the above described training and use of the visual localization network of FIGS. 1-8 is shown by line 4200. The percentages of successfully localized images at a given error threshold for the above described testing and use of the visual localization network using a ResNeXt101-32x8d backbone is shown by line 4300. The percentages of successfully localized images at a given error threshold for the standard feature-based method that relies on structure-from-motion reconstruction is shown by line 4100.

The percentages of successfully localized images at a given error threshold for the PoseNet with geometric loss is shown by line 4000. The percentages of successfully localized images at a given error threshold for the differentiable random sample consensus trained with a three-dimensional model is shown by line 4400.

The PoseNet performance with geometric loss (line 4000) is quite low because the training data does not contain enough variation: all images are captured at the same height, with a 0° roll and pitch. Consequently, the PoseNet performance with geometric loss learns this training data bias which is not valid anymore on the test data.

The performance of structure-from-motion reconstruction (line 4100) is also rather low because of the strong viewpoint changes, which make key point matching challenging, both for map generation (structure-from-motion reconstruction) and localization.

Both the above described training and use of the visual localization network of FIGS. 1-8 (lines 4200 and 4300) and the differentiable random sample consensus trained with a three-dimensional model (line 4400) significantly outperform the other approaches and reach an extremely high precision, with 75% of images localized with an error below 5 cm and 5°. At higher thresholds, the above described training and use of the visual localization network of FIGS. 1-8 (lines 4200 and 4300) saturates earlier (around 87% with ResNeXt101 backbone) than the differentiable random sample consensus trained with a three-dimensional model (line 4400).

To study the robustness to different lighting conditions, the performance averaged over the test sets with all lighting conditions without human, when training on all loops of the standard lighting condition only (FIG. 10), versus training on all loops and all lighting conditions (FIG. 11) are compared.

Figure 10:
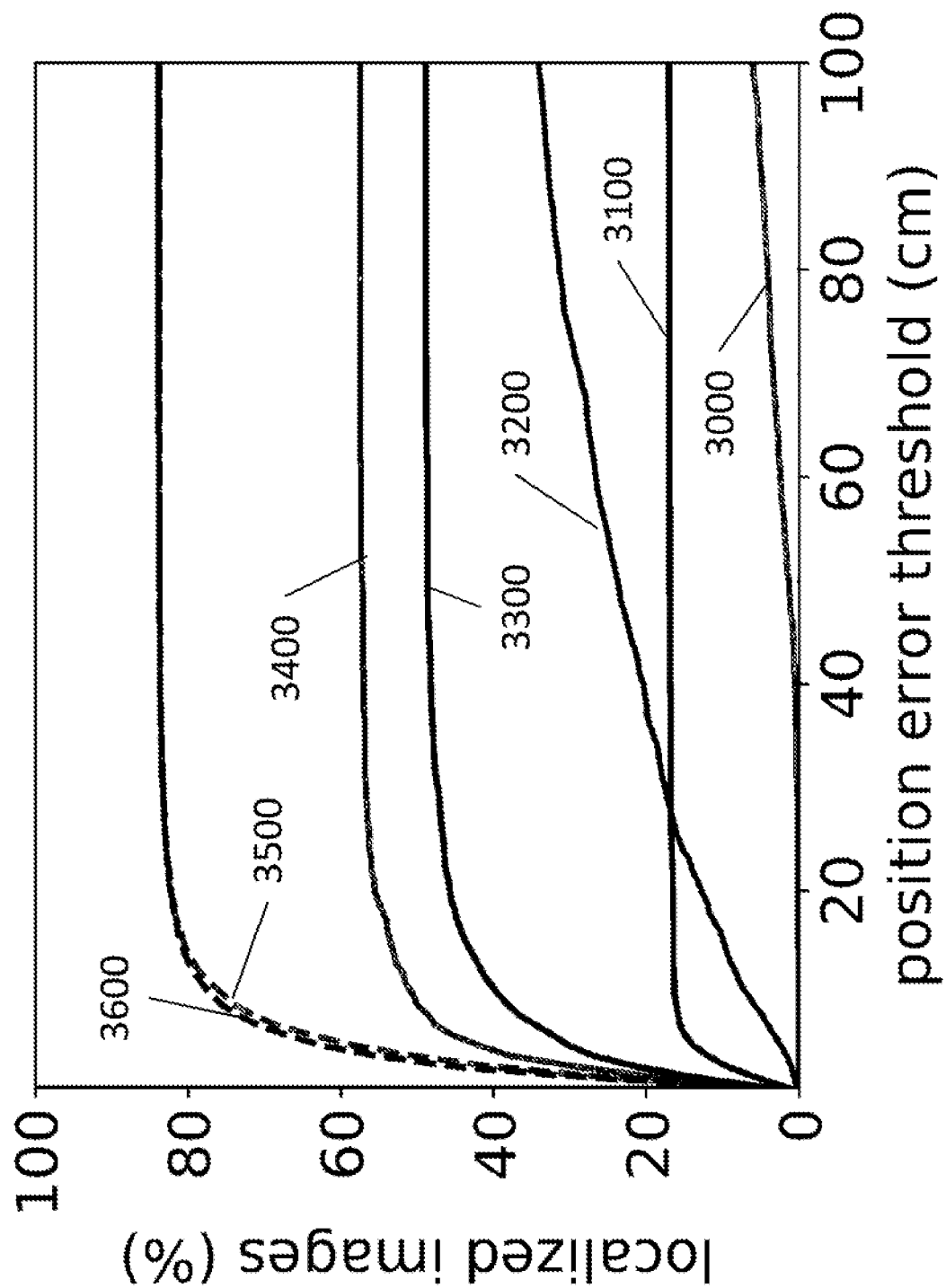
FIGS. 10 through 12 graphically illustrate percentage results of localized images on the test set for varying position error thresholds and a fixed angle error threshold of 5°.

As illustrated in FIG. 10, the performance of PoseNet (line 3000) drops by about 10% at 1 m and 5 thresholds when training on only one lighting condition, despite color jittering data augmentation at training. The performance of structure-from-motion reconstruction (line 3200) stays constant The performance of differentiable random sample consensus trained with a three-dimensional model (line 3100) without any color data augmentation drops significantly when training on one lighting condition; in detail, by a factor around 6, which is also the number of different lighting conditions. This means that only the images with the same lighting condition as training are localized, but almost not any other ones.

Moreover, as illustrated in FIG. 10, the performance of the above described training and use of the visual localization network of FIGS. 1-8 (lines 3400 and 3300) is significantly higher than the other approaches when training on one lighting condition, with about 50% of the images localized with an error below 25 cm and 5°.

In addition, color jittering was incorporated at training of the above described training and use of the visual localization network of FIGS. 1-8 (lines 3500 and 3600) to obtain a significant increase of performance, reaching almost 85% of localized images with an error below 25 cm and 5°. This performance is pretty close to the one obtained when training on all lighting conditions (FIG. 11), which can be considered as an upper bound of achievable results of the above described training and use of the visual localization network of FIGS. 1-8 when training on one lighting condition only.

In practice, this means that for real-world applications the above described training and use of the visual localization network of FIGS. 1-8 can be applied even if training data is captured only once with a particular light setting and tested with different ones.

Figure 12:
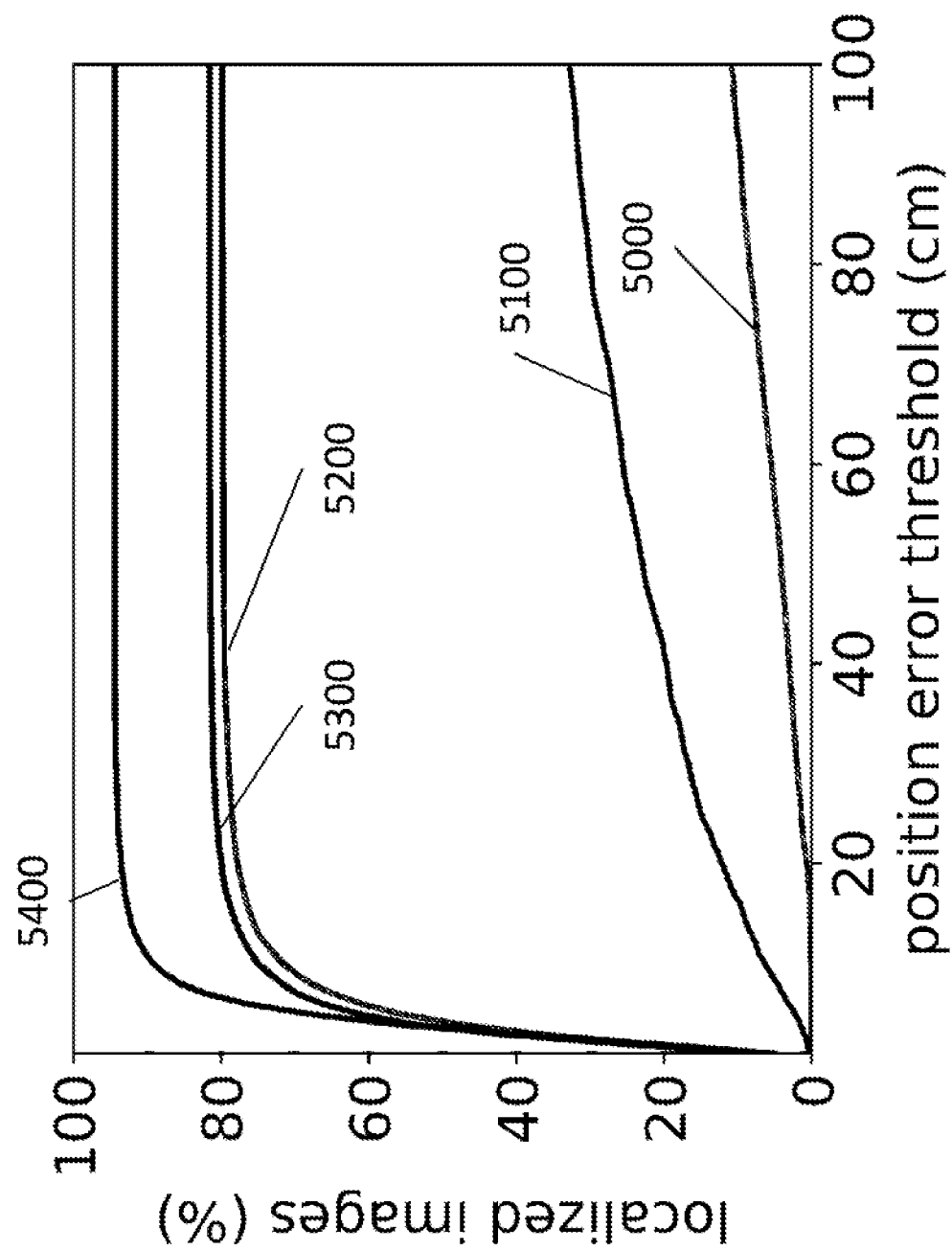

To study robustness to occlusions, the performance of all methods when training on all loops and all lighting conditions, and testing on (a) all lighting conditions without visitors, (FIG. 11), and (b) all lighting conditions and various visitor densities, (FIG. 12). All methods show a slight drop of performance. The decrease of performance of the above described training and use of the visual localization network of FIGS. 1-8 (lines 4200, 4300, 5200, 5300) mostly comes from situations where only one image is present and is mostly occluded, resulting in the absence of object-of-interest detection. In most cases however, the above described training and use of the visual localization network of FIGS. 1-8 is robust despite not having seen any human at training.

As described above and shown in the Figures, the differentiable random sample consensus trained with a three-dimensional model and the above described training and use of the visual localization network of FIGS. 1-8 obtain significantly better performances than all other methods, with a median error between 2 to 4 cm and more than 80% of the test images localized with an error below 10 cm and 5°.

To determine the impact of the amount of training data, the differentiable random sample consensus trained with a three-dimensional model and the above described training and use of the visual localization network of FIGS. 1-8 were evaluated with a reduced amount of training images. The evaluated methods trained and tested on the first lighting condition, without any human at test time.

Figure 13:
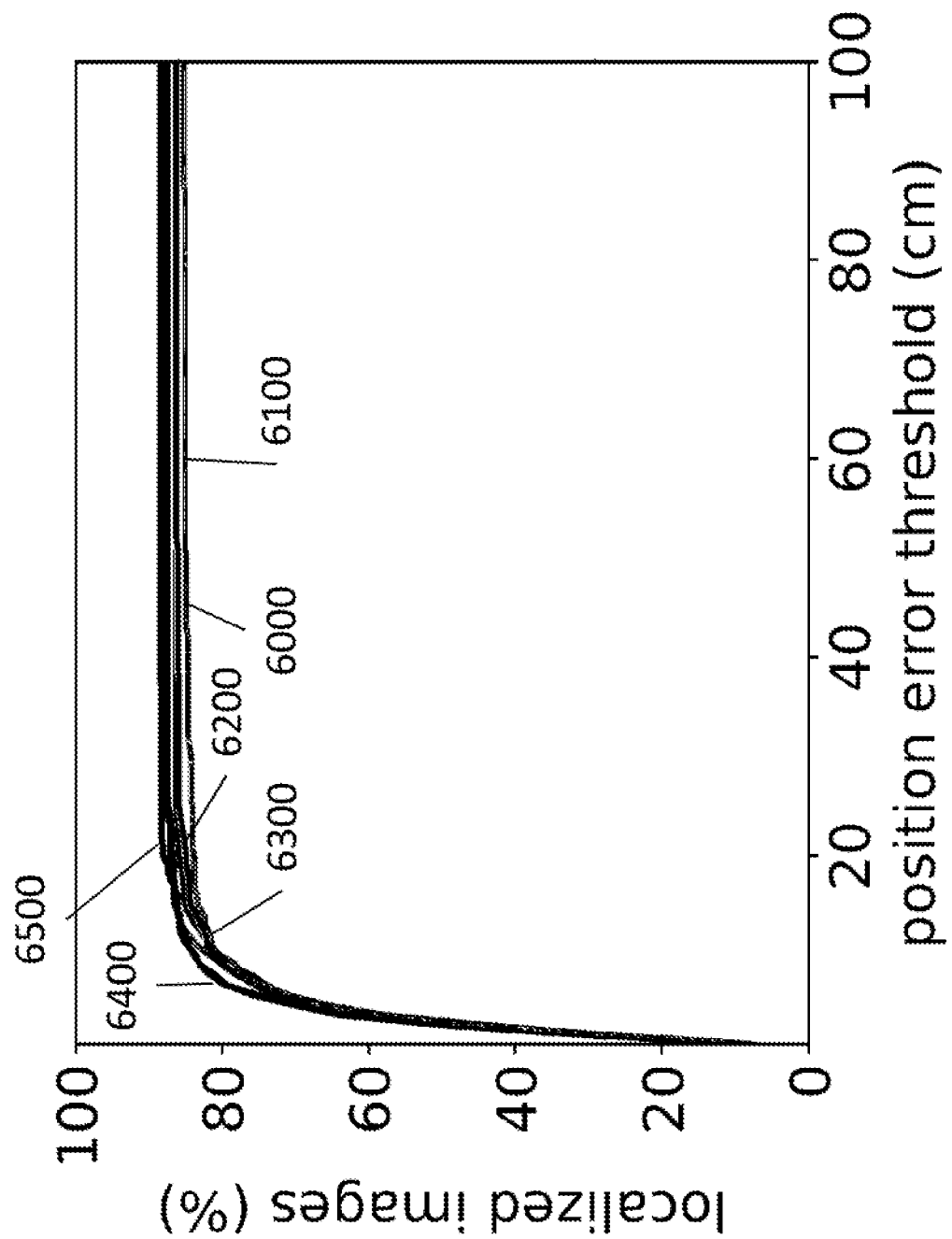
FIGS. 13 and 14 graphically illustrate percentage results of localized images on the test set with less training data for varying position error threshold and a fixed angle error threshold of 5.
Figure 14:
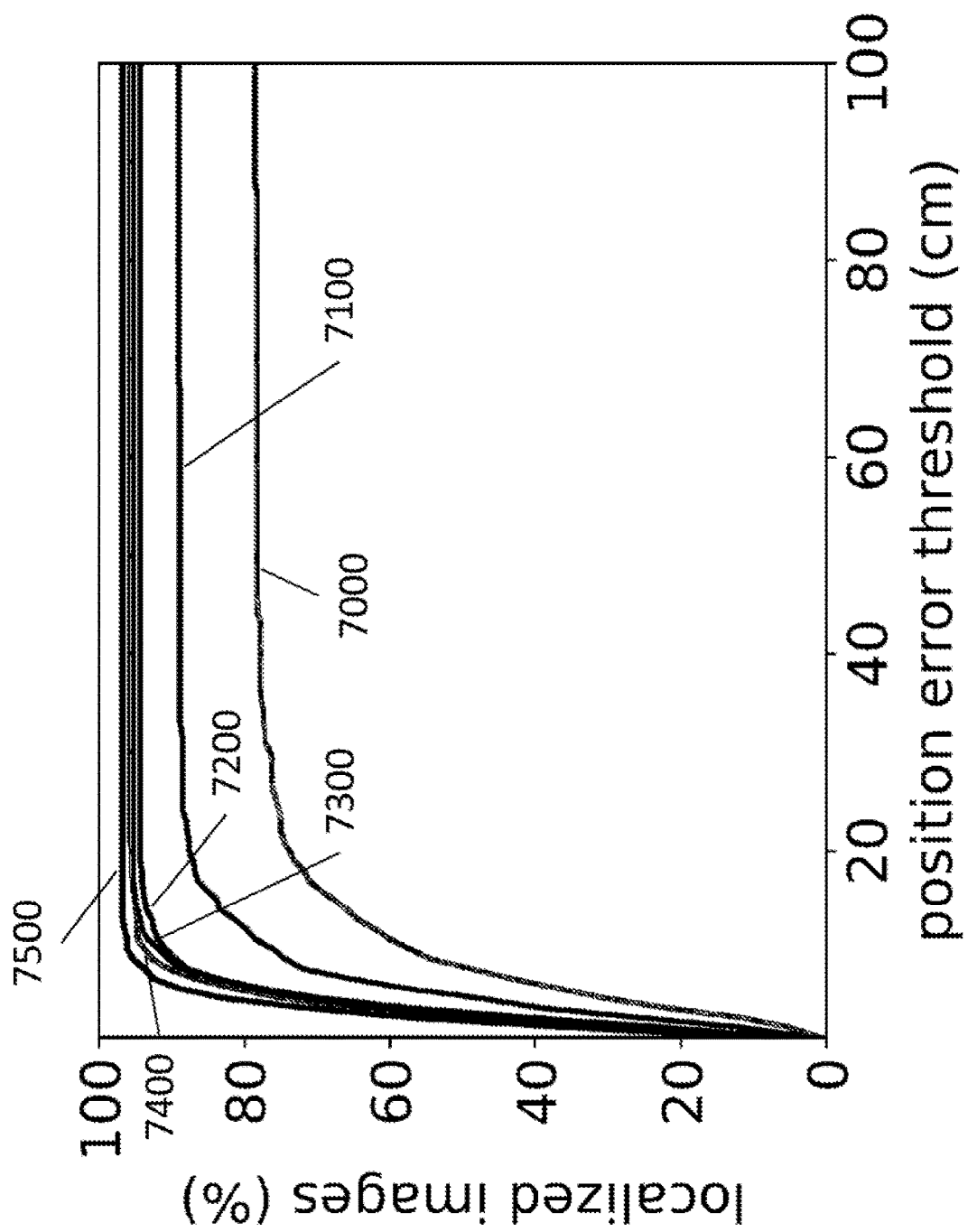

FIGS. 13 and 14 show the performance for different amount of training data for the above described training and use of the visual localization network of FIGS. 1-8 (FIG. 13) and the differentiable random sample consensus trained with a three-dimensional model (FIG. 14).

As illustrated in FIG. 13, the above described training and use of the visual localization network of FIGS. 1-8 was evaluated for six situations: (1) all loops (line 6500), (2) one loop (line 6300), (3) one loop with 50% of the images (line 6200), (4) one loop with 25% of the images (line 6400), (5) one loop with 10% of the images (line 6100), and (6) one loop with 7% of the images (line 6000).

As illustrated in FIG. 13, even with only one image out of 15 (7%) of the first loop as training data (line 6000), the above described training and use of the visual localization network of FIGS. 1-8 obtains a similar performance than with the all full loops, with a marginal drop of less than 3%. The above described training and use of the visual localization network of FIGS. 1-8 still localizes more than 80% with an error below 10 cm and 5°.

In contrast, as illustrated in FIG. 14, the differentiable random sample consensus trained with a three-dimensional model shows a larger drop when training with a few training data, especially on small positional error threshold.

As illustrated in FIG. 14, the differentiable random sample consensus trained with a three-dimensional model was evaluated for six situations: (1) all loops (line 7500), (2) one loop (line 7400), (3) one loop with 50% of the images (line 7300), (4) one loop with 25% of the images (line 7200), (5) one loop with 10% of the images (line 7100), and (6) one loop with 7% of the images (line 7000). For instance, 75% of the images are localized in the same range of 10 cm and 5° when training on 10% of the first loop and less than 60% when training on 7%.

The Baidu localization dataset was also used to evaluate (1) the above described training and use of the visual localization network of FIGS. 1-8, (2) a standard feature-based method that relies on structure-from-motion reconstruction, (3) PoseNet with geometric loss where the idea is basically to learn a convolution neural network to map images to camera pose, and (4) differentiable random sample consensus trained with a three-dimensional model.

The Baidu localization dataset consists of images captured in a Chinese shopping mall covering many challenges for visual localization approaches such as reflective and transparent surfaces, moving people, and repetitive structures. The Baidu localization dataset contains 689 images captured with DSLR cameras as training set and over 2000 cell phone photos taken by different users a few months later as query images.

The test images contain significant viewpoint changes compared to the training images that are all taken parallel or perpendicular with respect to the main corridor. All images were semi-automatically registered to the coordinate system defined by a LIDAR scanner. In the evaluations, the provided camera poses are used, i.e., both for training and testing Even if using the LIDAR would improve the three-dimensional reconstruction quality of our objects-of-interest, LIDAR was not used in the evaluations.

For objects-of-interest, the evaluations used a manually selected total of 220 instances from 164 classes representing different types of planar objects such as logos or posters on storefronts, and annotated the objects-of-interest with one segmentation mask. These annotations were propagated to all training images.

The Baidu localization dataset represents a realistic scenario, which makes the Baidu localization dataset extremely challenging, because: (a) the training data is limited to 689 images for a mall around 240 m long, (b) training and test images with different cameras and viewpoints, and (c) the environment has some changes in terms of lightings or dynamic objects.

Figure 15:
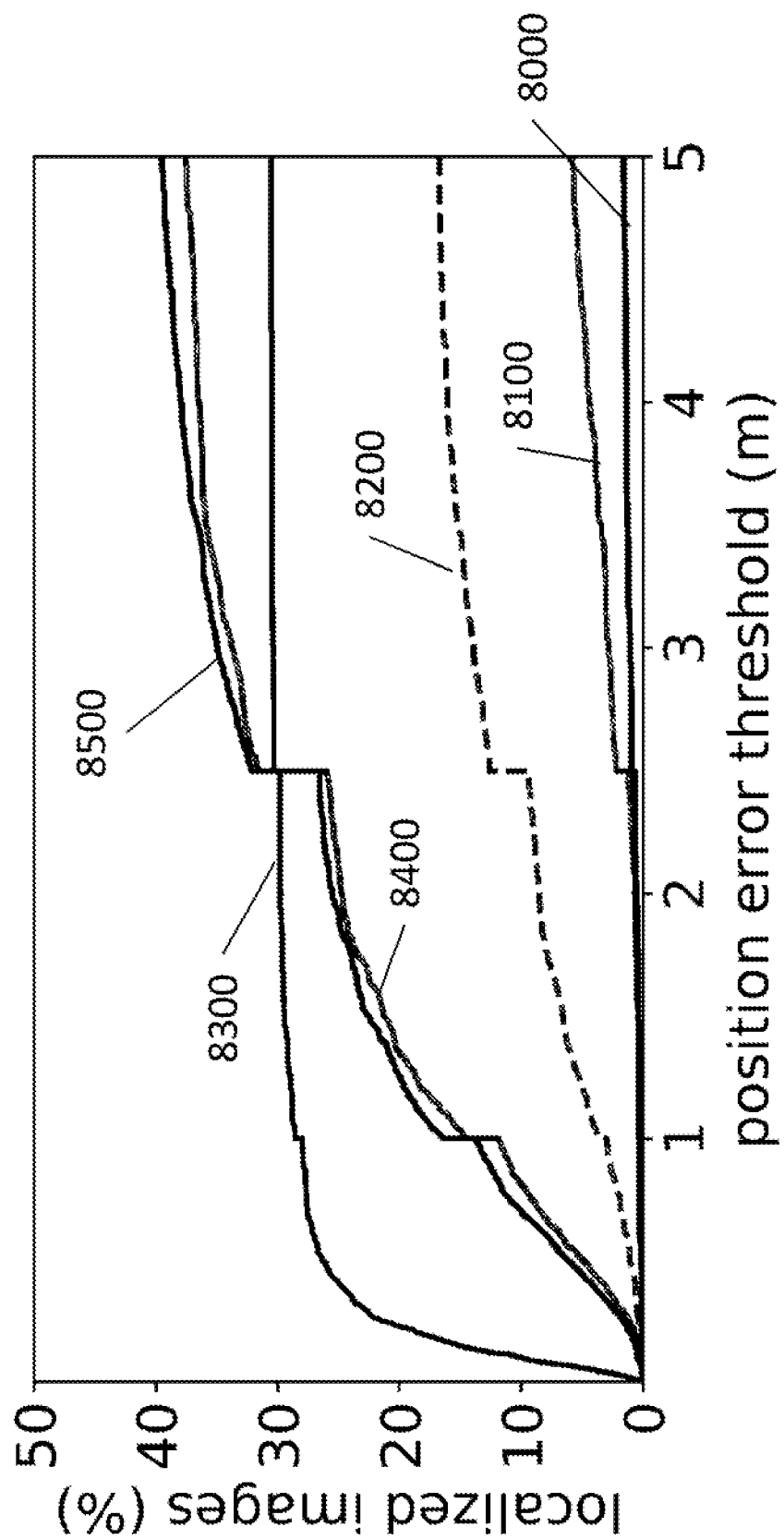
FIG. 15 graphically illustrates percentage results of localized images on another test set for varying position error thresholds and a fixed angle error threshold of 5°.

FIG. 15 shows the results of the Baidu localization dataset evaluation. As illustrated in FIG. 15, the results of the above described training and use of the visual localization network of FIGS. 1-8 on the Baidu localization dataset are shown by line 8400; the results of the above described training and use of the visual localization network of FIGS. 1-8 with Res-NeXt101 on the Baidu localization dataset are shown by line 8500; and the results of the above described training and use of the visual localization network of FIGS. 1-8 without data augmentation on the Baidu localization dataset are shown by line 8200.

The results of the standard feature-based method that relies on structure-from-motion reconstruction on the Baidu localization dataset are shown by line 8300; the results of the PoseNet with geometric loss on the Baidu localization dataset are shown by line 8100; and the results of the differentiable random sample consensus trained with a three-dimensional model on the Baidu localization dataset are shown by line 8000.

As illustrated in FIG. 15, the other approaches do not perform well at all, with less than 2% of images localized within a 2 m and 10° error threshold. The standard feature-based method that relies on structure-from-motion reconstruction is able to localize more images, with about 25% at 1 m and 5° and 30% at 5 m and 20°.

The above described training and use of the visual localization network of FIGS. 1-8 is a deep learning method that is able to compete with the other methods on the Baidu localization dataset. The above described training and use of the visual localization network of FIGS. 1-8 localizes successfully about 25% of the images with an error threshold of 1.5 m and 10° and almost 40% with an error threshold of 5 m and 20°.

It is noted that in about a third of the query images, no object-of-interest is detected and thus no localization estimate is provided.

It is noted that in evaluating the above described training and use of the visual localization network of FIGS. 1-8 without homography data augmentation, there was a significant decrease of performance, highlighting the benefit of the above described training and use of the visual localization network of FIGS. 1-8 by training with planar objects-of-interest.

It is noted that the above described training and use of the visual localization network of FIGS. 1-8 uses stable predefined areas and bridges the gap between precise localization and long-term stability in very vivid scenarios.

The above described training and use of the visual localization network of FIGS. 1-8 is based upon a deep learning-based visual localization method that finds a set of dense matches between some objects-of-interest in query images and the corresponding reference images; i.e., a canonical view of the object for which a set of two-dimensional to three-dimensional correspondences is available.

The above described training and use of the visual localization network of FIGS. 1-8 defines an object-of-interest as a discriminative area within the three-dimensional map which can be reliably detected from multiple viewpoints, partly occluded, and under various lighting conditions.

In addition, the above described training and use of the visual localization network of FIGS. 1-8 emulates DensePose, an extension of mask regional convolution neural network, which does not only detect and segment humans, but also regresses dense matches between pixels in the image and a mesh surface. In emulating DensePose, the above described training and use of the visual localization network of FIGS. 1-8 (*i*) detects and segments objects-of-interest and (ii) obtains a dense set of two-dimensional to two-dimensional matches between the detected objects and their reference images. Given these matches, together with the two-dimensional to three-dimensional correspondences of the reference images, the above described training and use of the visual localization network of FIGS. 1-8 obtains a set of two-dimensional to three-dimensional matches from which camera localization is obtained by solving a perspective-n-point problem using random sample consensus.

The above described training and use of the visual localization network of FIGS. 1-8 enables, by training in two-dimensions, training the neural network from a smaller set of training data, as the above described training and use of the visual localization network of FIGS. 1-8 artificially generates a rich set of viewpoints for each object with homography data augmentation.

Moreover, the above described training and use of the visual localization network of FIGS. 1-8 is robust to lighting changes when utilized with color data augmentation.

In addition, the above described training and use of the visual localization network of FIGS. 1-8 handles dynamic scenes with static objects-of-interest such that the above described training and use of the visual localization network of FIGS. 1-8 accurately estimates the pose in a scene with dynamic objects (humans in a museum) present, even if training data does not contain the dynamic objects.

Furthermore, if some of the objects-of-interest are moved, the above described training and use of the visual localization network of FIGS. 1-8 does not need to retrain the whole network as pose and scene regression-based approaches would require because the above described training and use of the visual localization network of FIGS. 1-8 avoids retraining by updating the two-dimensional to three-dimensional mapping of the reference images.

Also, the above described training and use of the visual localization network of FIGS. 1-8 is capable of focusing on discriminative objects, thus avoiding ambiguous textureless areas.

The above described training and use of the visual localization network of FIGS. 1-8 is capable of scaling up to large areas and high numbers of objects-of-interest, as object detectors in the objects-of-interest can segment thousands of categories.

The above described training and use of the visual localization network of FIGS. 1-8 can be utilized by an application on a mobile device to display metadata on paintings in a museum or on shops in malls and airports.

The above described training and use of the visual localization network of FIGS. 1-8 can also be utilized by an application on a mobile device in a complex and challenging real-world application, to guide the user to localize successfully. More specifically, the above described training and use of the visual localization network of FIGS. 1-8 enables the application on a mobile device to communicate commands such as "Take a picture of the closest painting," which is easier to understand than a command such as "Take a picture with sufficient visual information."

The above described training and use of the visual localization network of FIGS. 1-8 uses planar objects-of-interest, which are common in real-world applications: paintings, posters, store fronts or logos are frequent in environments, where localization is challenging such as shopping malls, airports, or museums.

It is noted that although the above described training and use of the visual localization network of FIGS. 1-8 focuses on the use of planar objects-of-interest, the above described training and use of the visual localization network of FIGS. 1-8 can be extended to non-planar objects.

The transformation, in the above described training and use of the visual localization network of FIGS. 1-8, between any instance of the planar object-of-interest in a training image and its reference image is a homography, thus allowing easy propagation dense sets of matches using a few correspondences.

With respect to the above described training and use of the visual localization network of FIGS. 1-8, the mapping between two-dimensional pixels in the reference image and three-dimensional world coordinates can be built from a small set of images since the planar objects-of-interest can be robustly reconstructed in three-dimension.

Utilizing planar objects-of-interest allow the above described training and use of the visual localization network of FIGS. 1-8 to train in two-dimensions, removing one degree of freedom compared to a three-dimensional coordinate regression used in conventional visual localization processes.

The above described training and use of the visual localization network of FIGS. 1-8 can be used with a minimal amount of manual annotations, being one instance segmentation for each (planar) object-of-interest in any training image.

Figure 16:
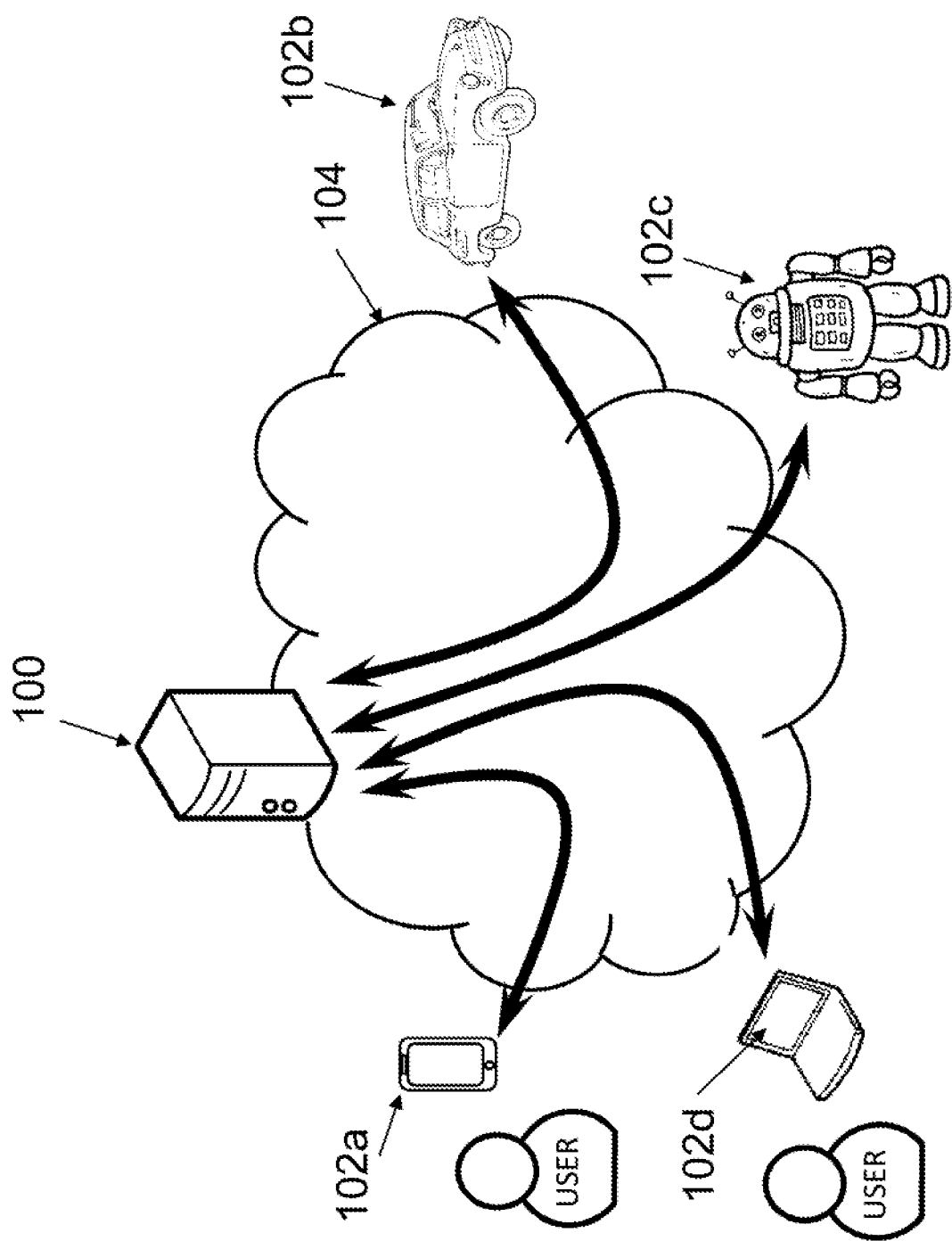
FIG. 16 illustrates an example of client-server architecture in which the disclosed methods may be performed.

The above-mentioned methods may be implemented within a client-server architecture such as illustrated in FIG. 16, which comprises server 100 and one or more client devices (102a, 102b, 102c, and 102d) that communicate over a network 104 (which may be wireless and/or wired) such as the Internet for data exchange. Server 100 and the client devices (102a, 102b, 102c, and 102d) include a data processor (not shown) and memory (not shown), such as a hard disk.

Although FIG. 16 illustrates the he client devices 102a, 102b, 102c, and 102d as autonomous vehicle 102b, robot 102c, computer 102d, or cell phone 102a the client device may be any device that communicates with server 100.

In operations, the client device (102a, 102b, 102c, or 102d) provides server 100 with a query image generated from a camera pose for determining localization of the camera pose in a predetermined environment using the above-mentioned methods. The localization is processed at server 100, which returns localization of the camera pose to client device (102a, 102b, 102c, or 102d). The method for training a neural network for computing the localization of a camera pose in a predetermined environment may also be performed at server 100 or in an alternate embodiment at a different server.

In summary, a method, using a data processor, for training, using a plurality of training images with corresponding six degrees of freedom camera pose for a predetermined environment and a plurality of reference images, each reference image depicting an object-of-interest in the predetermined environment and having a corresponding two-dimensional to three-dimensional correspondence for the predetermined environment, a neural network to provide visual localization of a camera pose in the predetermined environment, comprises (a) for each training image, detecting and segmenting object-of-interest in the training image; (b) generating a set of two-dimensional to two-dimensional matches between the detected and segmented objects-of-interest and corresponding reference images; (c) generating a set of two-dimensional to three-dimensional matches from the generated set of two-dimensional to two-dimensional matches and the two-dimensional to three-dimensional correspondences corresponding to the reference images; and (d) determining localization of the camera pose in the predetermined environment, for each training image, by solving a perspective-n-point problem using the generated set of two-dimensional to three-dimensional matches.

The set of two-dimensional to two-dimensional matches between the detected and segmented objects-of-interest and corresponding reference images may be generated by a regressing matches between the detected and segmented objects-of-interest and corresponding reference images.

The localization may be determined by solving a perspective-n-point problem using random sample consensus and the generated set of two-dimensional to three-dimensional matches.

The training images may be artificially generated with homography data augmentation.

The training images may be artificially generated with color data augmentation to train the neural network with respect to lighting changes.

The method may further comprise (e) when an object-of-interest in the predetermined environment is moved, updating, using structure-from-motion reconstruction, the corresponding two-dimensional to three-dimensional correspondence for the given environment without retraining the neural network.

The objects-of-interest may be planar objects-of-interest.

The set of two-dimensional to three-dimensional matches may be generated by transitivity.

The training images may not contain occlusions.

The neural network may be a convolutional neural network.

The generated set of two-dimensional to two-dimensional matches may be dense.

A method, using a trained neural network having a plurality of reference images, each reference image depicting an object-of-interest in a predetermined environment and having a corresponding two-dimensional to three-dimensional correspondence for the predetermined environment, for determining, from a query image generated from a camera pose, localization of the camera pose in the predetermined environment, comprises (a) detecting and segmenting an object-of-interest in the query image using the trained neural network; (b) generating a set of two-dimensional to two-dimensional matches between the detected and segmented object-of-interest and a corresponding reference image using the trained neural network; (c) generating a set of two-dimensional to three-dimensional matches from the generated set of two-dimensional to two-dimensional matches and the two-dimensional to three-dimensional correspondences corresponding to the reference image; and (d) determining localization of the camera pose in the predetermined environment, for the query image, by solving a perspective-n-point problem using the generated set of two-dimensional to three-dimensional matches.

The generated set of two-dimensional to two-dimensional matches may be dense.

The dense set of two-dimensional to two-dimensional matches between the detected and segmented object-of-interest and corresponding reference image may be generated by regressing dense matches between the detected and segmented object-of-interest and corresponding reference image.

The localization of the camera pose in the predetermined environment may be determined by solving a perspective-n-point problem using random sample consensus and the generated set of two-dimensional to three-dimensional matches.

The object-of-interest may be a planar object-of-interest.

The set of two-dimensional to three-dimensional matches may be generated by transitivity.

The trained neural network may be a trained convolutional neural network.

A neural network for use in training and determining localization of a camera pose in a predetermined environment, comprises a region proposal network to generate a box of region proposals; a RoIAlign layer, operatively connected to said region proposal network, to generate C-dimensional convolutional features; a faster regional convolution neural network, operatively connected to said RoIAlign layer, to predict objects-of-interest scores and perform per object-of-interest box regression; and a convolution neural network, operatively connected to said RoIAlign layer, to predict binary segmentation for each object-of-interest and to predict x and y reference image coordinates regression using an object-of-interest specific regressor.

The region proposal network may include a feature pyramid network.

The object-of-interest may be a planar object-of-interest.

A computer-implemented method for camera pose localization, comprises (a) receiving a query image generated from a camera pose; (b) accessing a neural network trained using a plurality of reference images, each reference image depicting an object-of-interest in a predetermined environment and having a corresponding two-dimensional to three-dimensional correspondence for the predetermined environment; (c) using the trained neural network for (c1) detecting and segmenting an object-of-interest in the query image, and (c2) generating a set of two-dimensional to two-dimensional matches between the detected and segmented object-of-interest and a corresponding reference image; (d) generating a set of two-dimensional to three-dimensional matches from the generated set of two-dimensional to two-dimensional matches and the two-dimensional to three-dimensional correspondences corresponding to the reference image; (e) determining localization of the camera pose in the predetermined environment, for the query image, by solving a perspective-n-point problem using the generated set of two-dimensional to three-dimensional matches; and (f) outputting the localization of the camera pose in the predetermined environment.

The generated set of two-dimensional to two-dimensional matches may be dense.

The trained neural network may be a trained convolutional neural network.

The trained neural network may be used for detecting and segmenting a plurality of objects-of-interest in the query image, and for generating a plurality of sets of two-dimensional to two-dimensional matches between each of the plurality of the detected and segmented objects-of-interest and a corresponding reference image.

A method, using a data processor, for training a neural network for determining, from a query image generated from a camera pose, localization of the camera pose in a predetermined environment, comprises (a) accessing a first frame of training data with two-dimensional pixels having an object-of-interest identified by a bounding box of a manual mask and a class label; (b) using structure-from-motion reconstruction to obtain three-dimensional positions of key points in the manual mask for the object-of-interest in the first frame of training data; (c) fitting a first homography describing a transformation between the two-dimensional pixels of the first frame of training data and the three-dimensional positions of key points in the manual mask for the object-of-interest in the first frame of training data; (d) using structure-from-motion reconstruction to obtain two-dimensional matches between key points in the manual mask for the object-of-interest in the first frame of training data and other frames of the training data, and the first homography to transform the two-dimensional matches to three-dimensional matches by transitivity; (e) fitting a second homography describing a transformation between the two-dimensional pixels of the first frame of training data and the two-dimensional pixels of a second frame of the training data if enough matches exist between key points of the first frame of training data and key points of the second frame of training data for the object-of-interest; (f) using the first homography and the second homography to propagate the bounding box of the manual mask for the object-of-interest to the second frame of training data to obtain a manual mask for an object-of-interest in the second frame of training data; and (g) assigning the class label of the object-of-interest to the bounding box of the manual mask for the object-of-interest in the second frame of training data if enough matches exist between key points of the first frame of training data and key points of the second frame of training data for the object-of-interest.

The method may further comprise repeating (e) and (g) for additional frames of training data.

The method may further comprise repeating (a) and (g) for additional objects-of-interest.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method, using a data processor, for training, using a plurality of training images with corresponding six degrees of freedom camera pose for a predetermined environment and a plurality of reference images, each reference image depicting an object-of-interest in the predetermined environment and having a corresponding two-dimensional to three-dimensional correspondence for the predetermined environment, a neural network to provide visual localization of a camera pose in the predetermined environment, comprising:
   (a) for each training image, detecting and segmenting object-of-interest in the training image;
   (b) generating a set of two-dimensional to two-dimensional matches between the detected and segmented objects-of-interest and corresponding reference images;
   (c) generating a set of two-dimensional to three-dimensional matches from the generated set of two-dimensional to two-dimensional matches and the two-dimensional to three-dimensional correspondences corresponding to the reference images; and
   (d) determining localization of the camera pose in the predetermined environment, for each training image, by solving a perspective-n-point problem using the generated set of two-dimensional to three-dimensional matches.

2. The method as claimed in claim 1, wherein the set of two-dimensional to two-dimensional matches between the detected and segmented objects-of-interest and corresponding reference images is generated by a regressing matches between the detected and segmented objects-of-interest and corresponding reference images.

3. The method as claimed in claim 1, wherein localization is determined by solving a perspective-n-point problem using random sample consensus and the generated set of two-dimensional to three-dimensional matches.

4. The method as claimed in claim 1, wherein the training images are artificially generated with homography data augmentation.

5. The method as claimed in claim 1, wherein the training images are artificially generated with color data augmentation to train the neural network with respect to lighting changes.

6. The method as claimed in claim 1, further comprising:
(e) when an object-of-interest in the predetermined environment is moved, updating, using structure-from-motion reconstruction, the corresponding two-dimensional to three-dimensional correspondence for the given environment without retraining the neural network.

7. The method as claimed in claim 1, wherein the objects-of-interest are planar objects-of-interest.

8. The method as claimed in claim 1, wherein the set of two-dimensional to three-dimensional matches is generated by transitivity.

9. The method as claimed in claim 1, wherein the training images do not contain occlusions.

10. The method as claimed in claim 1, wherein the neural network is a convolutional neural network.

11. The method as claimed in claim 1, wherein the generated set of two-dimensional to two-dimensional matches is dense.

12. A method, using a trained neural network having a plurality of reference images, each reference image depicting an object-of-interest in a predetermined environment and having a corresponding two-dimensional to three-dimensional correspondence for the predetermined environment, for determining, from a query image generated from a camera pose, localization of the camera pose in the predetermined environment, comprising:
(a) detecting and segmenting an object-of-interest in the query image using the trained neural network;
(b) generating a set of two-dimensional to two-dimensional matches between the detected and segmented object-of-interest and a corresponding reference image using the trained neural network;
(c) generating a set of two-dimensional to three-dimensional matches from the generated set of two-dimensional to two-dimensional matches and the two-dimensional to three-dimensional correspondences corresponding to the reference image; and
(d) determining localization of the camera pose in the predetermined environment, for the query image, by solving a perspective-n-point problem using the generated set of two-dimensional to three-dimensional matches.

13. The method as claimed in claim 12, wherein the generated set of two-dimensional to two-dimensional matches is dense.

14. The method as claimed in claim 13, wherein the dense set of two-dimensional to two-dimensional matches between the detected and segmented object-of-interest and corresponding reference image is generated by regressing dense matches between the detected and segmented object-of-interest and corresponding reference image.

15. The method as claimed in claim 12, wherein localization of the camera pose in the predetermined environment is determined by solving a perspective-n-point problem using random sample consensus and the generated set of two-dimensional to three-dimensional matches.

16. The method as claimed in claim 12, wherein the object-of-interest is a planar object-of-interest.

17. The method as claimed in claim 12, wherein the set of two-dimensional to three-dimensional matches is generated by transitivity.

18. The method as claimed in claim 12, wherein the trained neural network is a trained convolutional neural network.

19. A computer-implemented method for camera pose localization, comprising:
(a) receiving a query image generated from a camera pose;
(b) accessing a neural network trained using a plurality of reference images, each reference image depicting an object-of-interest in a predetermined environment and having a corresponding two-dimensional to three-dimensional correspondence for the predetermined environment;
(c) using the trained neural network for (c1) detecting and segmenting an object-of-interest in the query image, and (c2) generating a set of two-dimensional to two-dimensional matches between the detected and segmented object-of-interest and a corresponding reference image;
(d) generating a set of two-dimensional to three-dimensional matches from the generated set of two-dimensional to two-dimensional matches and the two-dimensional to three-dimensional correspondences corresponding to the reference image;
(e) determining localization of the camera pose in the predetermined environment, for the query image, by solving a perspective-n-point problem using the generated set of two-dimensional to three-dimensional matches; and
(f) outputting the localization of the camera pose in the predetermined environment.

20. The method as claimed in claim 19, wherein the generated set of two-dimensional to two-dimensional matches is dense.

21. The method as claimed in claim 19, wherein the trained neural network is a trained convolutional neural network.

22. The method as claimed in claim 19, wherein the trained neural network is used for detecting and segmenting a plurality of objects-of-interest in the query image, and for generating a plurality of sets of two-dimensional to two-dimensional matches between each of the plurality of the detected and segmented objects-of-interest and a corresponding reference image.

23. A method, using a data processor, for training a neural network for determining, from a query image generated from a camera pose, localization of the camera pose in a predetermined environment, comprising:
(a) accessing a first frame of training data with two-dimensional pixels having an object-of-interest identified by a bounding box of a manual mask and a class label;
(b) using structure-from-motion reconstruction to obtain three-dimensional positions of key points in the manual mask for the object-of-interest in the first frame of training data;
(c) fitting a first homography describing a transformation between the two-dimensional pixels of the first frame of training data and the three-dimensional positions of key points in the manual mask for the object-of-interest in the first frame of training data;
(d) using structure-from-motion reconstruction to obtain two-dimensional matches between key points in the manual mask for the object-of-interest in the first frame of training data and other frames of the training data, and the first homography to transform the two-dimensional matches to three-dimensional matches by transitivity;

(e) fitting a second homography describing a transformation between the two-dimensional pixels of the first frame of training data and the two-dimensional pixels of a second frame of the training data if enough matches exist between key points of the first frame of training data and key points of the second frame of training data for the object-of-interest;

(f) using the first homography and the second homography to propagate the bounding box of the manual mask for the object-of-interest to the second frame of training data to obtain a manual mask for an object-of-interest in the second frame of training data; and (g) assigning the class label of the object-of-interest to the bounding box of the manual mask for the object-of-interest in the second frame of training data if enough matches exist between key points of the first frame of training data and key points of the second frame of training data for the object-of-interest.

24. The method as claimed in claim 23, further comprising repeating (e) and (g) for additional frames of training data.

25. The method as claimed in claim 23, further comprising repeating (a) and (g) for additional objects-of-interest.

* * * * *